(12) United States Patent
Surazhsky et al.

(10) Patent No.: US 10,559,112 B2
(45) Date of Patent: Feb. 11, 2020

(54) HYBRID MECHANISM FOR EFFICIENT RENDERING OF GRAPHICS IMAGES IN COMPUTING ENVIRONMENTS

(71) Applicant: INTEL CORPORATION, Santa Clara, CA (US)

(72) Inventors: Tatiana Surazhsky, Yokneam Illit (IL); Uzi Sarel, Zichron Yaakov (IL); Jacob Subag, Kiryat Haim Haifa (IL)

(73) Assignee: INTEL CORPORATION, Santa Clara, CA (US)

(*) Notice: Subject to any disclaimer, the term of this patent is extended or adjusted under 35 U.S.C. 154(b) by 0 days.

(21) Appl. No.: 15/179,678

(22) Filed: Jun. 10, 2016

(65) Prior Publication Data

US 2017/0263040 A1 Sep. 14, 2017

Related U.S. Application Data

(60) Provisional application No. 62/306,878, filed on Mar. 11, 2016.

(51) Int. Cl.
*G06T 15/00* (2011.01)

(52) U.S. Cl.
CPC .................. *G06T 15/005* (2013.01)

(58) Field of Classification Search
CPC ..... G06T 15/005; G06T 15/80; G06T 15/205; G06T 15/04
See application file for complete search history.

(56) References Cited

U.S. PATENT DOCUMENTS

| | | | |
|---|---|---|---|
| 2007/0002048 A1* | 1/2007 | Takashima | G06T 15/04 345/426 |
| 2007/0070083 A1* | 3/2007 | Fouladi | G06T 15/005 345/604 |
| 2010/0135418 A1* | 6/2010 | Zhang | H04N 19/44 375/240.25 |
| 2015/0235341 A1* | 8/2015 | Mei | G06T 1/60 345/426 |
| 2016/0127682 A1* | 5/2016 | Turbell | H04N 7/141 348/14.03 |
| 2016/0225117 A1* | 8/2016 | Sarna | G06T 15/005 |

* cited by examiner

*Primary Examiner* — Diane M Wills
(74) *Attorney, Agent, or Firm* — Jaffery Watson Mendonsa & Hamilton LLP

(57) ABSTRACT

A mechanism is described for facilitating hybrid rendering of graphics images in computing environments. A method of embodiments, as described herein, includes detecting the video stream including two-dimensional (2D) images, where the video stream is processed through a graphics pipeline at a computing device. The method may further include performing hybrid combination of a luma (Y)-plane with chrominance (UV)-planes to directly generate a YUV texture, wherein the YUV texture is used to generate three-dimensional (3D) images corresponding to the 2D images.

24 Claims, 25 Drawing Sheets

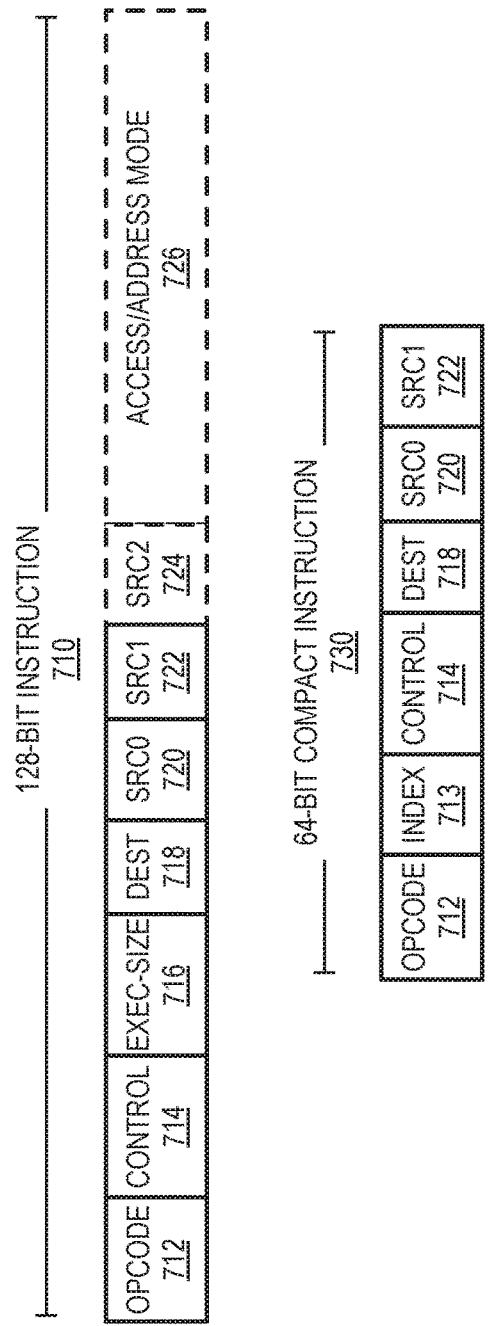
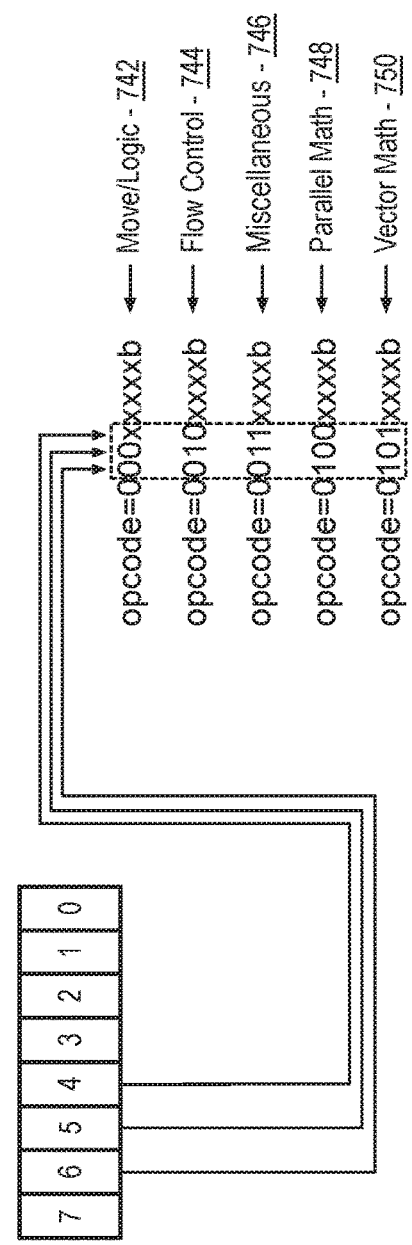
FIG. 7

FIG. 9A  GRAPHICS PROCESSOR COMMAND FORMAT
900
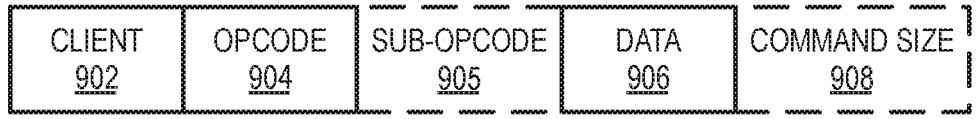
FIG. 9B  GRAPHICS PROCESSOR COMMAND SEQUENCE
910
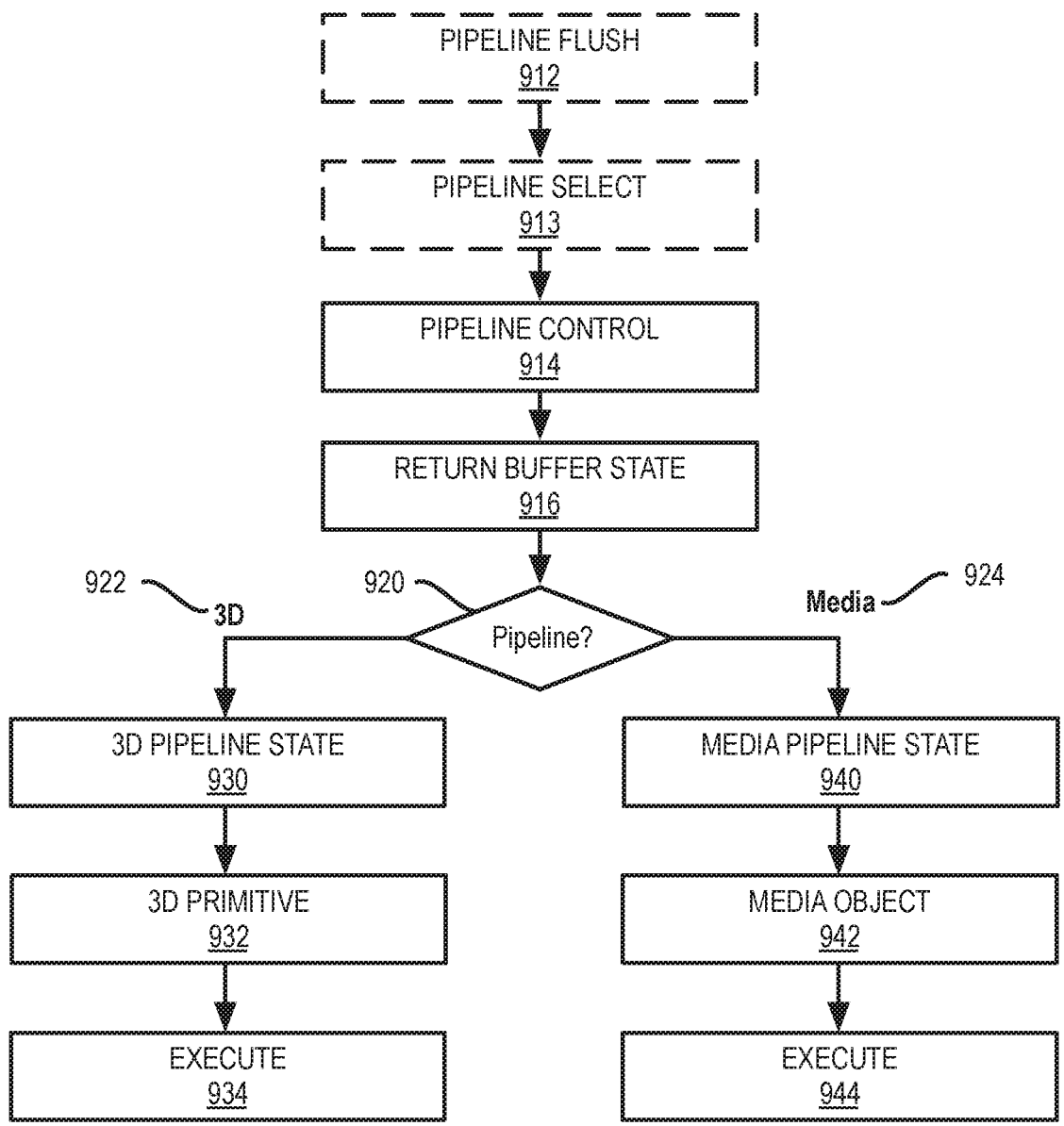

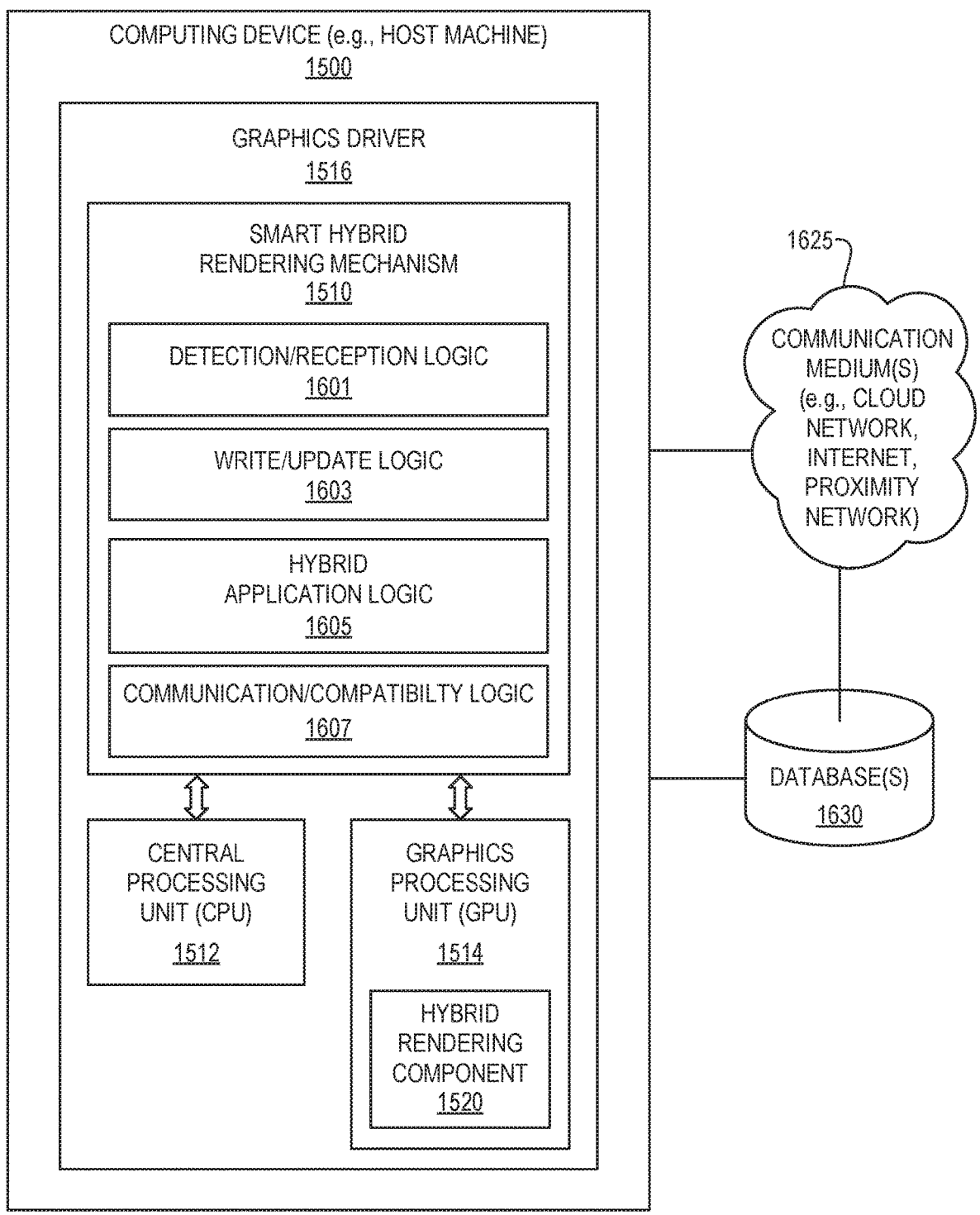

US 10,559,112 B2

HYBRID MECHANISM FOR EFFICIENT RENDERING OF GRAPHICS IMAGES IN COMPUTING ENVIRONMENTS

CLAIM OF PRIORITY

This application claims priority to U.S. Provisional Patent Application No. 62/306,878, entitled COLOR SPACE HYBRID RENDERING FOR EFFICIENT PROCESSING OF GRAPHICS DATA IN COMPUTING ENVIRONMENTS, by Jacob Subag, et al., filed Mar. 11, 2016, now pending, the benefit of and priority to which are claimed thereof and the entire contents of which are incorporated herein by reference.

FIELD

Embodiments described herein generally relate to computers. More particularly, embodiments are described for facilitating hybrid rendering of graphics images in computing environments.

BACKGROUND

In modern computing devices, various effects, such as enhancing effects, augmented reality, etc., are often added to video streams, obtained from cameras or files, using three-dimensional (3D) application user interface (APIs), such as Open Graphics Library (OpenGL®). However, such processes often require detours involving a preparing different layout than what is eventually displayed, where such detours inefficient and add significant bandwidth overhead.

BRIEF DESCRIPTION OF THE DRAWINGS

Embodiments are illustrated by way of example, and not by way of limitation, in the figures of the accompanying drawings in which like reference numerals refer to similar elements.

FIG. 7 is a block diagram illustrating a graphics processor instruction formats according to some embodiments.

FIG. 9A is a block diagram illustrating a graphics processor command format according to an embodiment.

FIG. 9B is a block diagram illustrating a graphics processor command sequence according to an embodiment.

FIG. 16 illustrates a smart hybrid rendering mechanism according to one embodiment.

DETAILED DESCRIPTION

Figure 1:
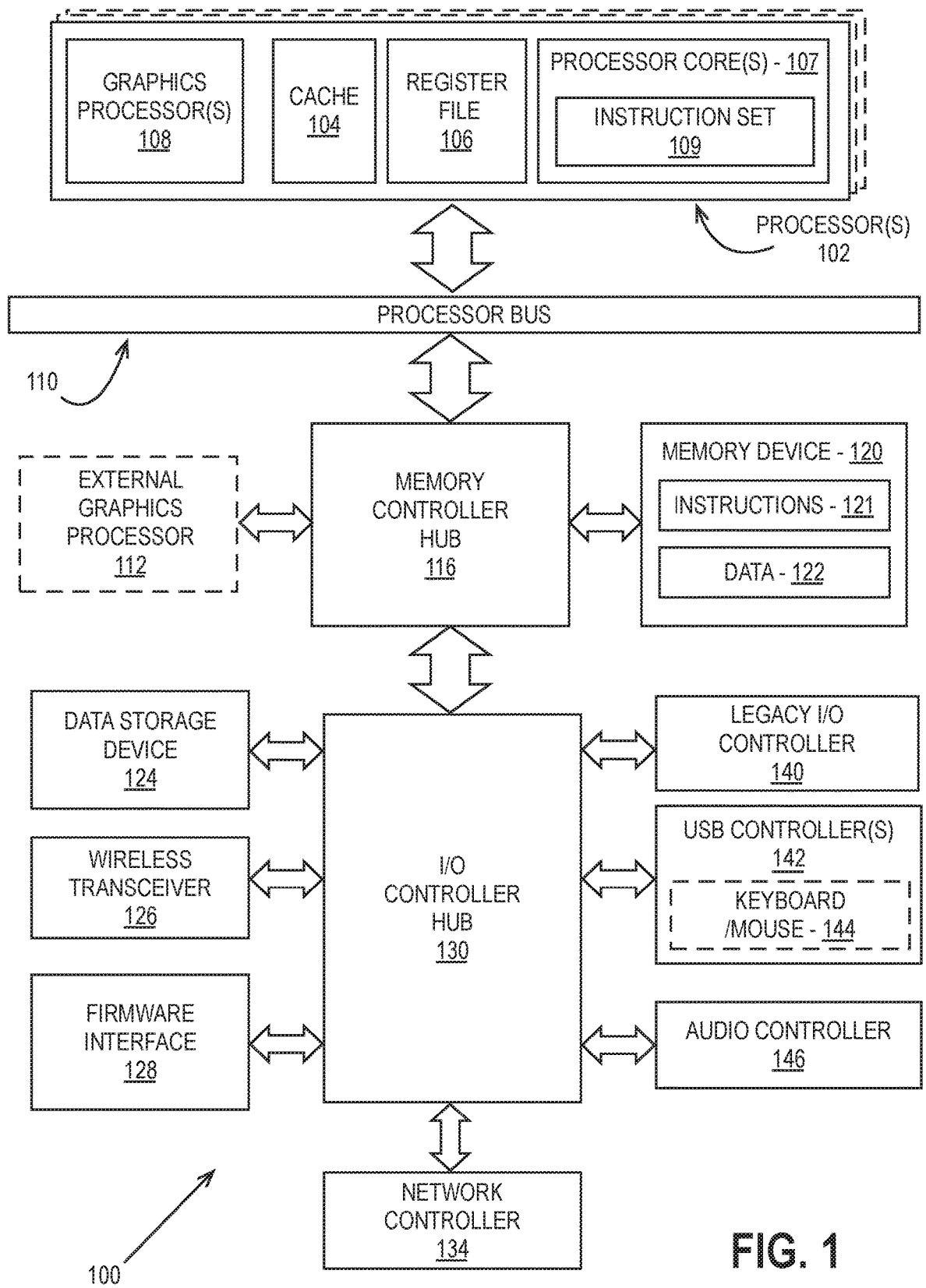
FIG. 1 is a block diagram of a processing system, according to an embodiment.

In the following description, numerous specific details are set forth. However, embodiments, as described herein, may be practiced without these specific details. In other instances, well-known circuits, structures and techniques have not been shown in details in order not to obscure the understanding of this description.

Embodiments provide for a novel technique for hybrid rendering of luma (Y) chrominance (UV) texture ("YUV texture") using existing capabilities and backends without any processing detours or paths, such as generating RGB layouts, etc. For example, a Y channel is rendered using a standard pixel backend, while UV channels are written using a store command. In another embodiment, this YUV rendering may be performed by added or modified graphics hardware.

It is contemplated that YUV represents a color space (such as one luma component, two chrominance components) that is typically part of a color image pipeline. For example, YUV takes into account the human perception when encoding color images or vides, allowing for masking of transmission errors and compression artifacts when compared to a red green blue (RGB) texture representation. For example, using conventional techniques, images of video streams are first converted into RGB texture representations before they can be converted into YUV texture representations and thus, such conventional techniques are inefficient and result in waste of bandwidth.

It is contemplated that terms like "request", "query", "job", "work", "work item", and "workload" may be referenced interchangeably throughout this document. Similarly, an "application" or "agent" may refer to or include a computer program, a software application, a game, a workstation application, etc., offered through an application programming interface (API), such as a free rendering API, such as Open Graphics Library (OpenGL®), DirectX® 11, DirectX® 12, etc., where "dispatch" may be interchangeably referred to as "work unit" or "draw" and similarly, "application" may be interchangeably referred to as "workflow" or simply "agent". For example, a workload, such as that of a three-dimensional (3D) game, may include and issue any number and type of "frames" where each frame may represent an image (e.g., sailboat, human face). Further, each frame may include and offer any number and type of work units, where each work unit may represent a part (e.g., mast of sailboat, forehead of human face) of the image (e.g., sailboat, human face) represented by its corresponding frame. However, for the sake of consistency, each item may be referenced by a single term (e.g., "dispatch", "agent", etc.) throughout this document.

In some embodiments, terms like "display screen" and "display surface" may be used interchangeably referring to the visible portion of a display device while the rest of the display device may be embedded into a computing device, such as a smartphone, a wearable device, etc. It is contemplated and to be noted that embodiments are not limited to any particular computing device, software application, hardware component, display device, display screen or surface, protocol, standard, etc. For example, embodiments may be applied to and used with any number and type of real-time applications on any number and type of computers, such as desktops, laptops, tablet computers, smartphones, head-mounted displays and other wearable devices, and/or the like. Further, for example, rendering scenarios for efficient performance using this novel technique may range from simple scenarios, such as desktop compositing, to complex scenarios, such as 3D games, augmented reality applications, etc.

System Overview

FIG. 1 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In one embodiment, the system 100 is a processing platform incorporated within a system-on-a-chip (SoC) integrated circuit for use in mobile, handheld, or embedded devices.

An embodiment of system 100 can include, or be incorporated within a server-based gaming platform, a game console, including a game and media console, a mobile gaming console, a handheld game console, or an online game console. In some embodiments system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled with a processor bus 110 to transmit communication signals such as address, data, or control signals between processor 102 and other components in system 100. In one embodiment the system 100 uses an exemplary 'hub' system architecture, including a memory controller hub 116 and an Input Output (I/O) controller hub 130. A memory controller hub 116 facilitates communication between a memory device and other components of system 100, while an I/O Controller Hub (ICH) 130 provides connections to I/O devices via a local I/O bus. In one embodiment, the logic of the memory controller hub 116 is integrated within the processor.

Memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller hub 116 also couples with an optional external graphics processor 112, which may communicate with the one or more graphics processors 108 in processors 102 to perform graphics and media operations.

In some embodiments, ICH 130 enables peripherals to connect to memory device 120 and processor 102 via a high-speed I/O bus. The I/O peripherals include, but are not limited to, an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple with ICH 130. In some embodiments, a high-performance network controller (not shown) couples with processor bus 110. It will be appreciated that the system 100 shown is exemplary and not limiting, as other types of data processing systems that are differently configured may also be used. For example, the I/O controller hub 130 may be integrated within the one or more processor 102, or the memory controller hub 116 and I/O controller hub 130 may be integrated into a discreet external graphics processor, such as the external graphics processor 112.

Figure 2:
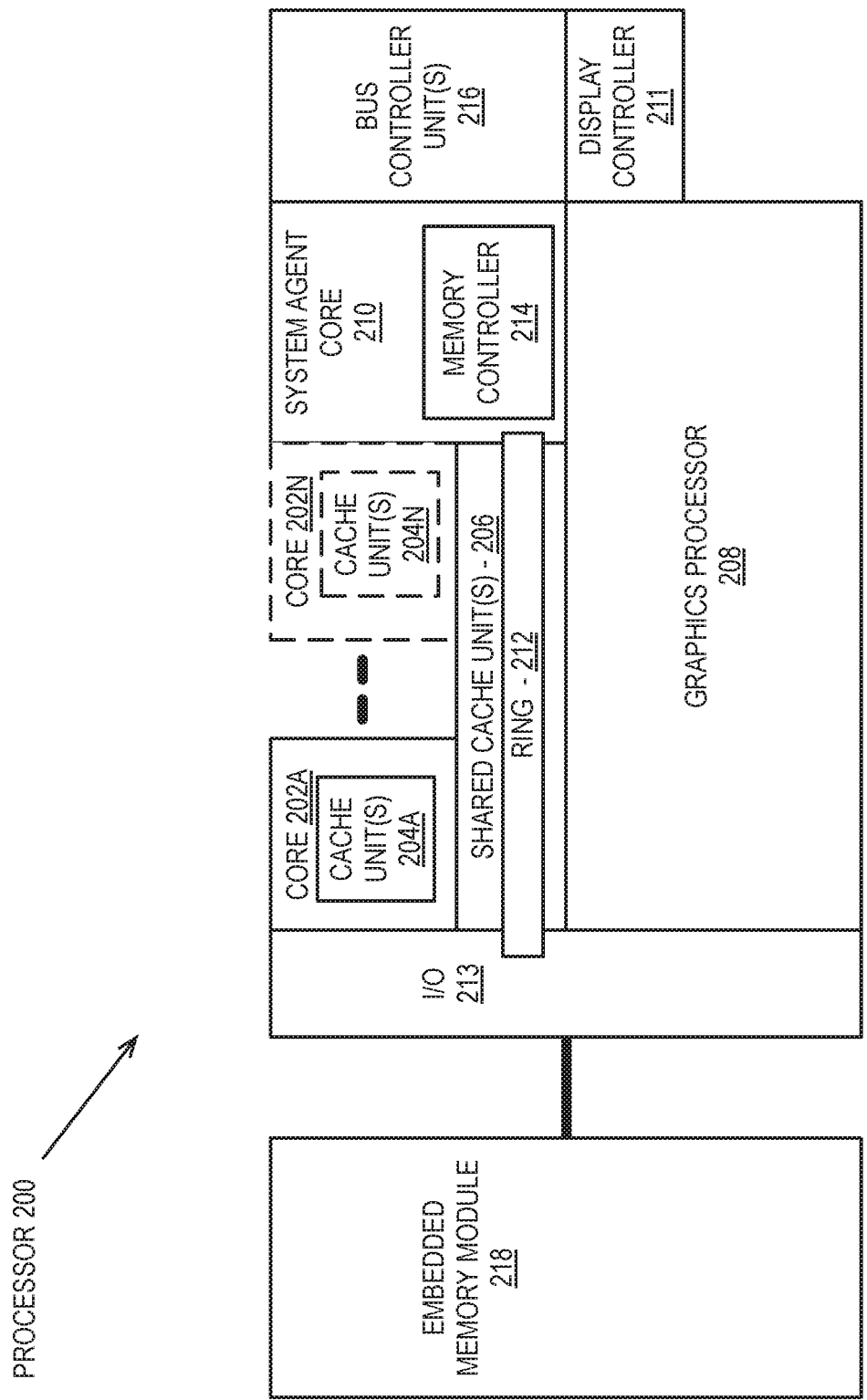
FIG. 2 is a block diagram of an embodiment of a processor having one or more processor cores, an integrated memory controller, and an integrated graphics processor.

FIG. 2 is a block diagram of an embodiment of a processor 200 having one or more processor cores 202A-202N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more Peripheral Component Interconnect buses (e.g., PCI, PCI Express). System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, a display controller 211 is coupled with the graphics processor 208 to drive graphics processor output to one or more coupled displays. In some embodiments, display controller 211 may be a separate module coupled with the graphics processor via at least one interconnect, or may be integrated within the graphics processor 208 or system agent core 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202A-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-202N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 3:
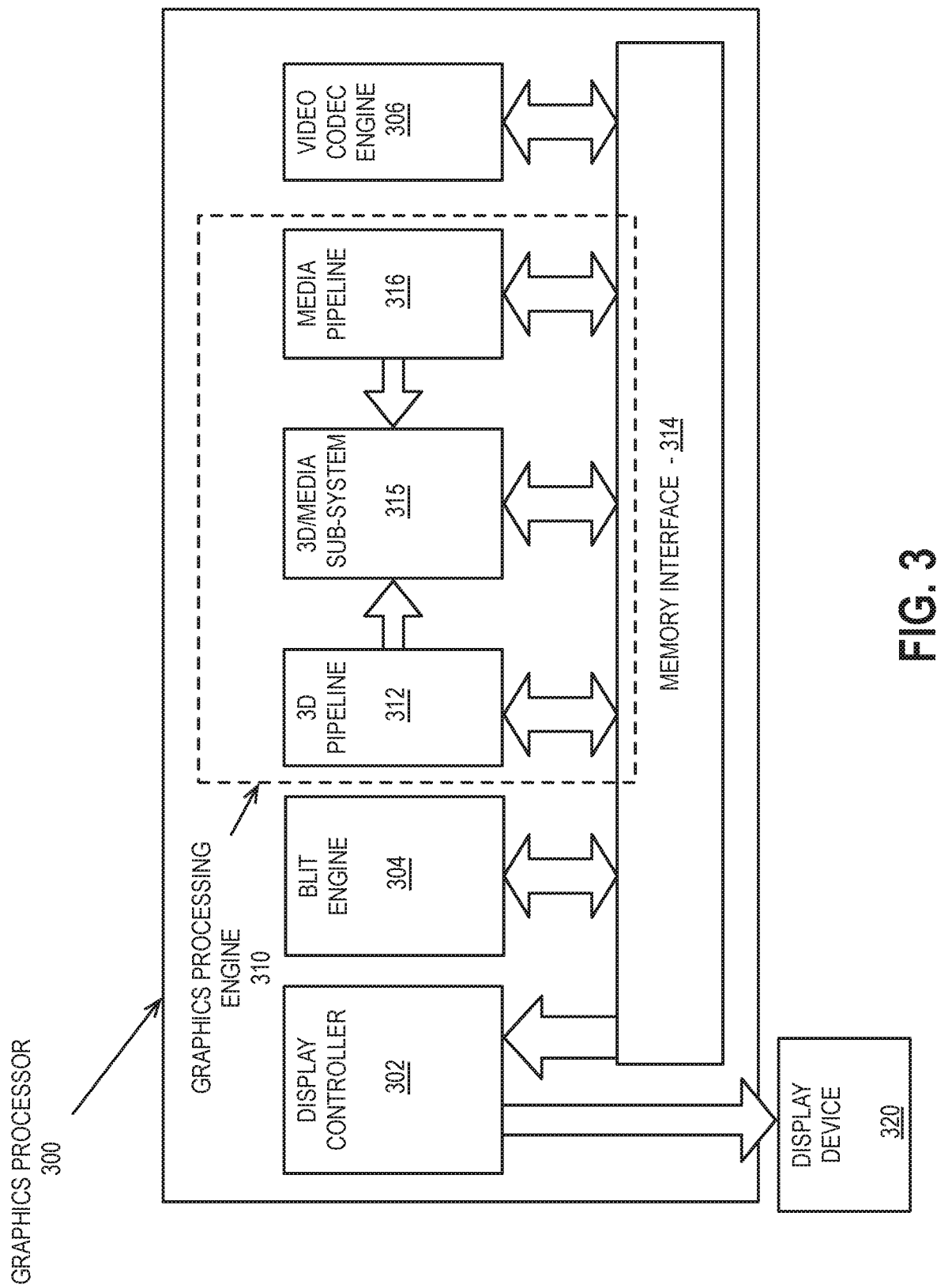
FIG. 3 is a block diagram of a graphics processor, which may be a discrete graphics processing unit, or may be a graphics processor integrated with a plurality of processing cores.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, GPE 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media subsystem 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

Graphics Processing Engine

Figure 4:
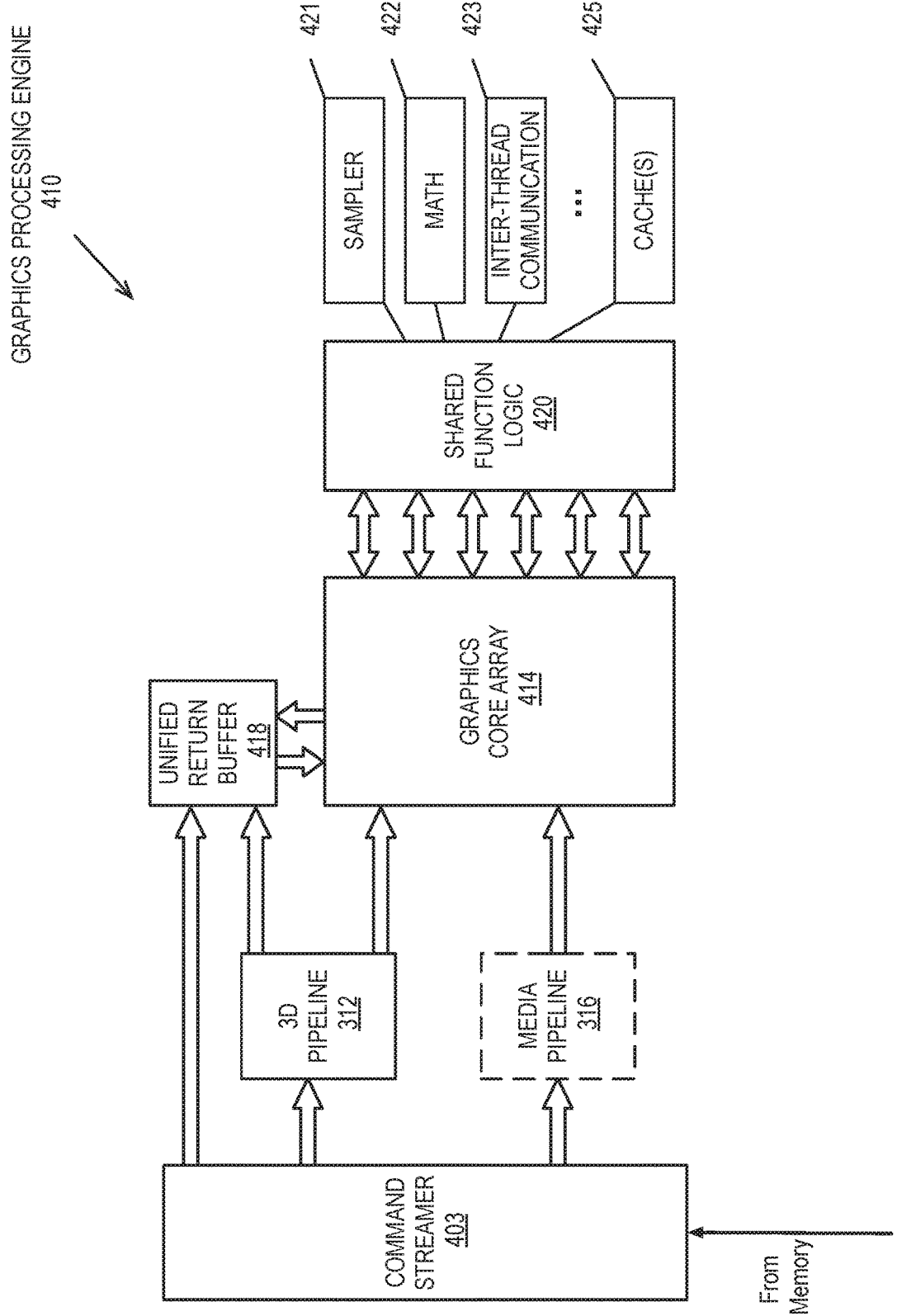
FIG. 4 is a block diagram of a graphics processing engine of a graphics processor in accordance with some embodiments.

FIG. 4 is a block diagram of a graphics processing engine 410 of a graphics processor in accordance with some embodiments. In one embodiment, the graphics processing engine (GPE) 410 is a version of the GPE 310 shown in FIG. 3. Elements of FIG. 4 having the same reference numbers (or names) as the elements of any other figure herein can operate or function in any manner similar to that described elsewhere herein, but are not limited to such. For example, the 3D pipeline 312 and media pipeline 316 of FIG. 3 are illustrated. The media pipeline 316 is optional in some embodiments of the GPE 410 and may not be explicitly included within the GPE 410. For example and in at least one embodiment, a separate media and/or image processor is coupled to the GPE 410.

In some embodiments, GPE 410 couples with or includes a command streamer 403, which provides a command stream to the 3D pipeline 312 and/or media pipelines 316. In some embodiments, command streamer 403 is coupled with memory, which can be system memory, or one or more of internal cache memory and shared cache memory. In some embodiments, command streamer 403 receives commands from the memory and sends the commands to 3D pipeline 312 and/or media pipeline 316. The commands are directives fetched from a ring buffer, which stores commands for the 3D pipeline 312 and media pipeline 316. In one embodiment, the ring buffer can additionally include batch command buffers storing batches of multiple commands. The commands for the 3D pipeline 312 can also include references to data stored in memory, such as but not limited to vertex and geometry data for the 3D pipeline 312 and/or image data and memory objects for the media pipeline 316.

The 3D pipeline 312 and media pipeline 316 process the commands and data by performing operations via logic within the respective pipelines or by dispatching one or more execution threads to a graphics core array 414.

In various embodiments the 3D pipeline 312 can execute one or more shader programs, such as vertex shaders, geometry shaders, pixel shaders, fragment shaders, compute shaders, or other shader programs, by processing the instructions and dispatching execution threads to the graphics core array 414. The graphics core array 414 provides a unified block of execution resources. Multi-purpose execution logic (e.g., execution units) within the graphic core array 414 includes support for various 3D API shader languages and can execute multiple simultaneous execution threads associated with multiple shaders.

In some embodiments the graphics core array 414 also includes execution logic to perform media functions, such as video and/or image processing. In one embodiment, the execution units additionally include general-purpose logic that is programmable to perform parallel general purpose computational operations, in addition to graphics processing operations. The general purpose logic can perform processing operations in parallel or in conjunction with general purpose logic within the processor core(s) 107 of FIG. 1 or core 202A-202N as in FIG. 2.

Output data generated by threads executing on the graphics core array 414 can output data to memory in a unified return buffer (URB) 418. The URB 418 can store data for multiple threads. In some embodiments the URB 418 may be used to send data between different threads executing on the graphics core array 414. In some embodiments the URB 418 may additionally be used for synchronization between threads on the graphics core array and fixed function logic within the shared function logic 420.

In some embodiments, graphics core array 414 is scalable, such that the array includes a variable number of graphics cores, each having a variable number of execution units based on the target power and performance level of GPE 410. In one embodiment the execution resources are dynamically scalable, such that execution resources may be enabled or disabled as needed.

The graphics core array 414 couples with shared function logic 420 that includes multiple resources that are shared between the graphics cores in the graphics core array. The shared functions within the shared function logic 420 are hardware logic units that provide specialized supplemental functionality to the graphics core array 414. In various embodiments, shared function logic 420 includes but is not limited to sampler 421, math 422, and inter-thread communication (ITC) 423 logic. Additionally, some embodiments implement one or more cache(s) 425 within the shared function logic 420. A shared function is implemented where the demand for a given specialized function is insufficient for inclusion within the graphics core array 414. Instead a single instantiation of that specialized function is implemented as a stand-alone entity in the shared function logic 420 and shared among the execution resources within the graphics core array 414. The precise set of functions that are shared between the graphics core array 414 and included within the graphics core array 414 varies between embodiments.

Figure 5:
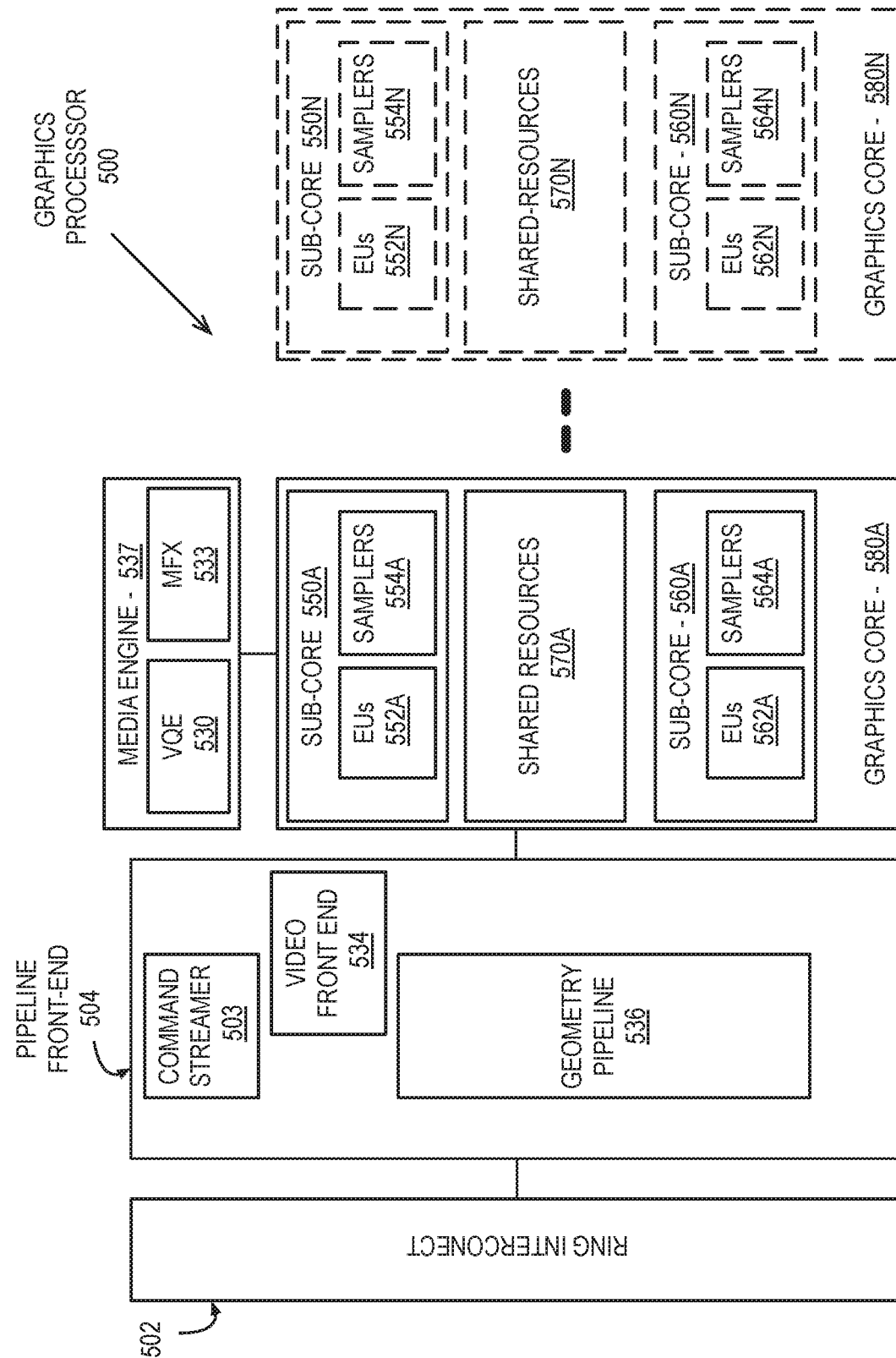
FIG. 5 is a block diagram of another embodiment of a graphics processor.

FIG. 5 is a block diagram of another embodiment of a graphics processor 500. Elements of FIG. 5 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-580N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-580N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-580N (sometimes referred to as core slices), each having multiple sub-cores 550A-550N, 560A-560N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second sub-core 560A. In other embodiments, the graphics processor is a low power processor with a single sub-core (e.g., 550A). In some embodiments, graphics processor 500 includes multiple graphics cores 580A-580N, each including a set of first sub-cores 550A-550N and a set of second sub-cores 560A-560N. Each sub-core in the set of first sub-cores 550A-550N includes at least a first set of execution units 552A-552N and media/texture samplers 554A-554N. Each sub-core in the set of second sub-cores 560A-560N includes at least a second set of execution units 562A-562N and samplers 564A-564N. In some embodiments, each sub-core 550A-550N, 560A-560N shares a set of shared resources 570A-570N. In some embodiments, the shared resources include shared cache memory and pixel operation logic. Other shared resources may also be included in the various embodiments of the graphics processor.

Execution Units

Figure 6:
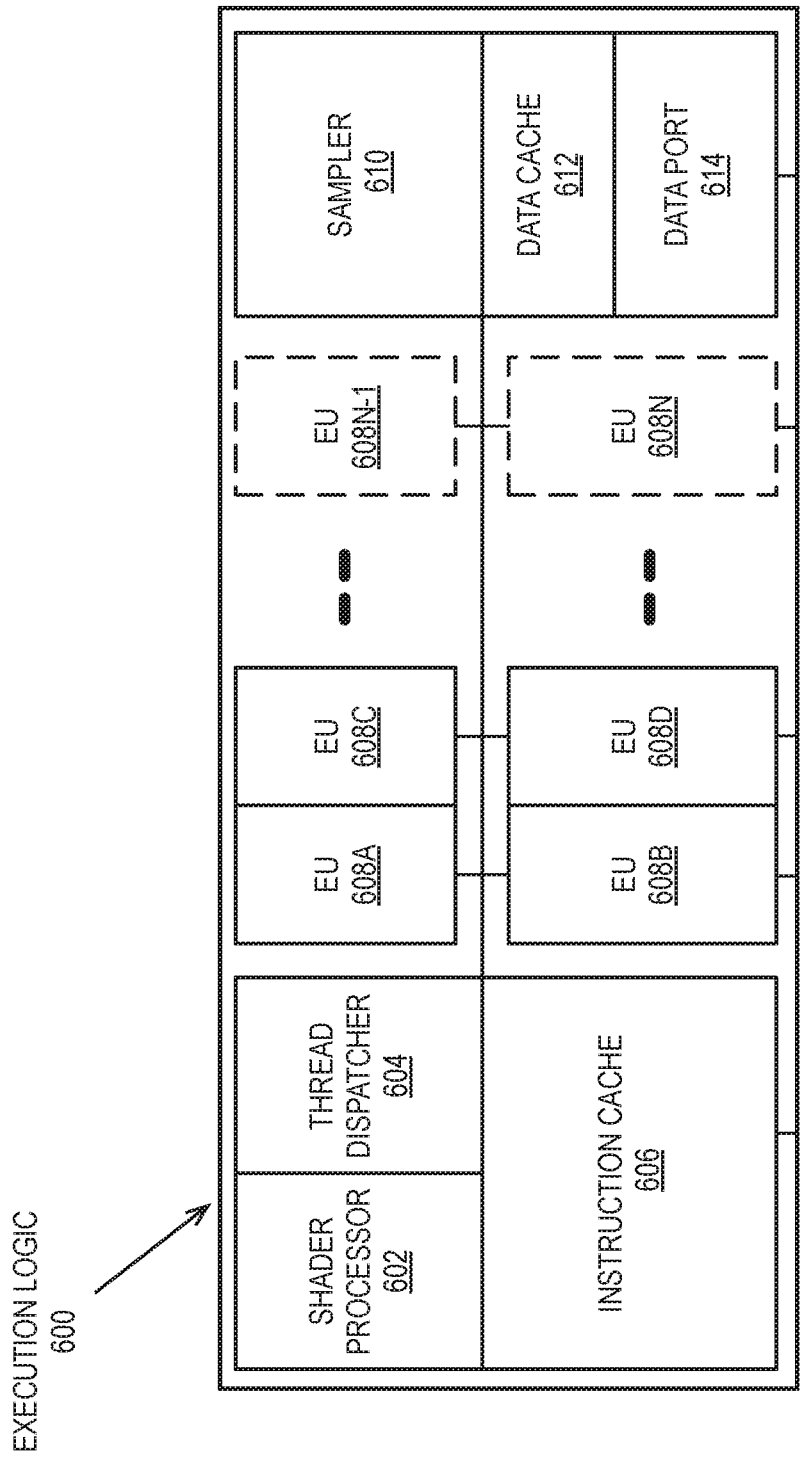
FIG. 6 illustrates thread execution logic including an array of processing elements employed in some embodiments of a graphics processing engine.

FIG. 6 illustrates thread execution logic 600 including an array of processing elements employed in some embodiments of a GPE. Elements of FIG. 6 having the same reference numbers (or names) as the elements of any other figure herein can operate or function in any manner similar to that described elsewhere herein, but are not limited to such.

In some embodiments, thread execution logic 600 includes a shader processor 602, a thread dispatcher 604, instruction cache 606, a scalable execution unit array including a plurality of execution units 608A-608N, a sampler 610, a data cache 612, and a data port 614. In one embodiment the scalable execution unit array can dynamically scale by enabling or disabling one or more execution units (e.g., any of execution unit 608A, 608B, 608C, 608D, through 608N-1 and 608N) based on the computational requirements of a workload. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution units 608A-608N. In some embodiments, each execution unit (e.g. 608A) is a stand-alone programmable general purpose computational unit that is capable of executing multiple simultaneous hardware threads while processing multiple data elements in parallel for each thread. In various embodiments, the array of execution units 608A-608N is scalable to include any number individual execution units.

In some embodiments, the execution units 608A-608N are primarily used to execute shader programs. A shader processor 602 can process the various shader programs and dispatch execution threads associated with the shader programs via a thread dispatcher 604. In one embodiment the thread dispatcher includes logic to arbitrate thread initiation requests from the graphics and media pipelines and instantiate the requested threads on one or more execution unit in the execution units 608A-608N. For example, the geometry pipeline (e.g., 536 of FIG. 5) can dispatch vertex, tessellation, or geometry shaders to the thread execution logic 600 (FIG. 6) for processing. In some embodiments, thread dispatcher 604 can also process runtime thread spawning requests from the executing shader programs.

In some embodiments, the execution units 608A-608N support an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders). Each of the execution units 608A-608N is capable of multi-issue single instruction multiple data (SIMD) execution and multi-threaded operation enables an efficient execution environment in the face of higher latency memory accesses. Each hardware thread within each execution unit has a dedicated high-bandwidth register file and associated independent thread-state. Execution is multi-issue per clock to pipelines capable of integer, single and double precision floating point operations, SIMD branch capability, logical operations, transcendental operations, and other miscellaneous operations. While waiting for data from memory or one of the shared functions, dependency logic within the execution units 608A-608N causes a waiting thread to sleep until the requested data has been returned. While the waiting thread is sleeping, hardware resources may be devoted to processing other threads. For example, during a delay associated with a vertex shader operation, an execution unit can perform operations for a pixel shader, fragment shader, or another type of shader program, including a different vertex shader.

Each execution unit in execution units 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes SIMD instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, a sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. Once a group of geometric objects has been processed and rasterized into pixel data, pixel processor logic (e.g., pixel shader logic, fragment shader logic, etc.) within the shader processor 602 is invoked to further compute output information and cause results to be written to output surfaces (e.g., color buffers, depth buffers, stencil buffers, etc.). In some embodiments, a pixel shader or fragment shader calculates the values of the various vertex attributes that are to be interpolated across the rasterized object. In some embodiments, pixel processor logic within the shader processor 602 then executes an application programming interface (API)-supplied pixel or fragment shader program. To execute the shader program, the shader processor 602 dispatches threads to an execution unit (e.g., 608A) via thread dispatcher 604. In some embodiments, pixel shader 602 uses texture sampling logic in the sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit instruction format 710. A 64-bit compacted instruction format 730 is available for some instructions based on the selected instruction, instruction options, and number of operands. The native 128-bit instruction format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit instruction format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For instructions in the 128-bit instruction format 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 720, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode field 726 specifying, for example, whether direct register addressing mode or indirect register addressing mode is used. When direct register addressing mode is used, the register address of one or more operands is directly provided by bits in the instruction.

In some embodiments, the 128-bit instruction format 710 includes an access/address mode field 726, which specifies an address mode and/or an access mode for the instruction. In one embodiment the access mode is used to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In one embodiment, the address mode portion of the access/address mode field 726 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
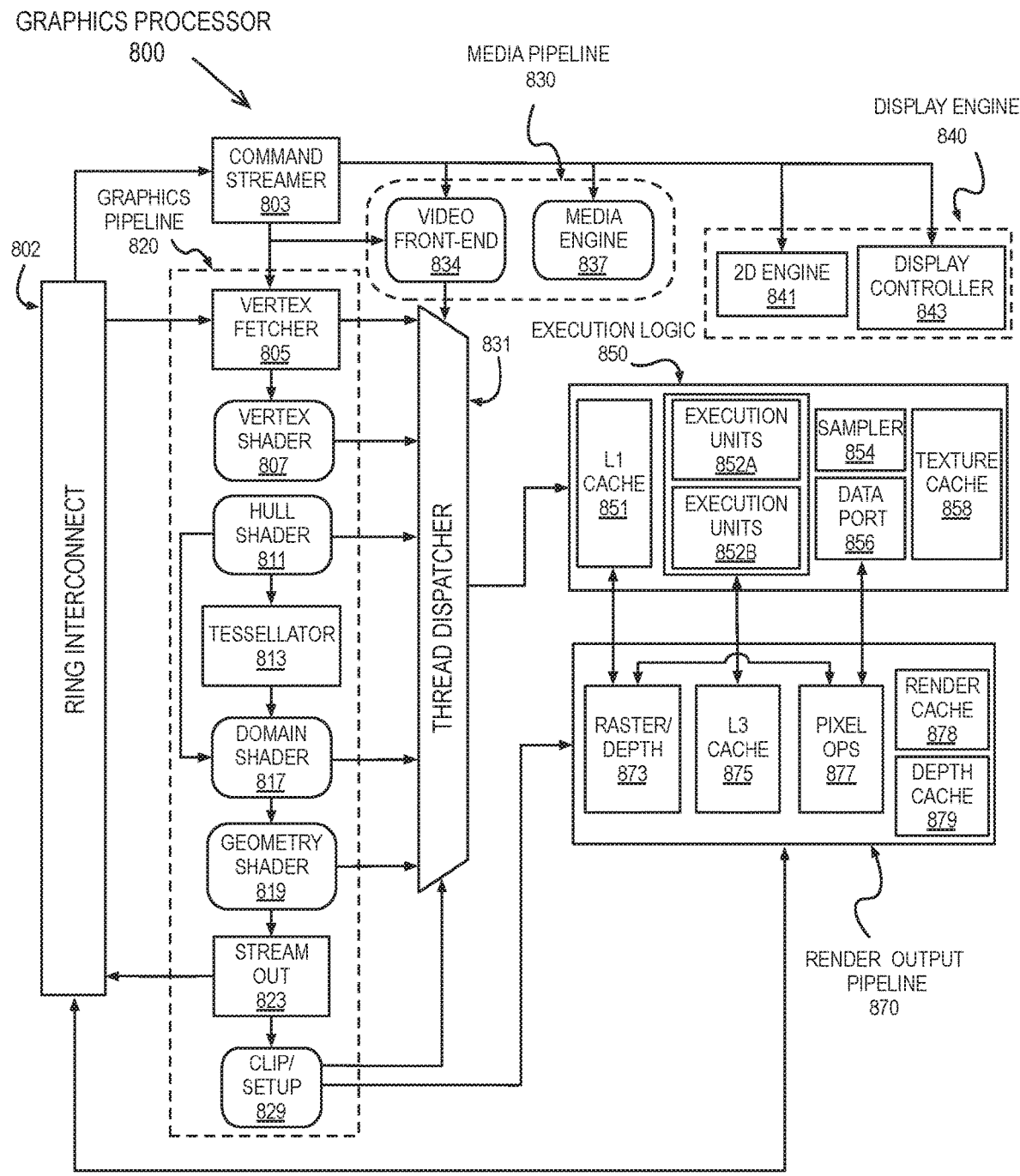
FIG. 8 is a block diagram of another embodiment of a graphics processor.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A-852B via a thread dispatcher 831.

In some embodiments, execution units 852A-852B are an array of vector processors having an instruction set for performing graphics and media operations. In some embodiments, execution units 852A-852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output, where tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components (e.g., hull shader 811, tessellator 813, and domain shader 817) can be bypassed.

In some embodiments, complete geometric objects can be processed by a geometry shader 819 via one or more threads dispatched to execution units 852A-852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into their per pixel representations. In some embodiments, pixel shader logic is included in thread execution logic 850. In some embodiments, an application can bypass the rasterizer and depth test component 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A-852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A-852B each have separate memory access paths.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834.

In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 837 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL), Open Computing Language (OpenCL), and/or Vulkan graphics and compute API, all from the Khronos Group. In some embodiments, support may also be provided for the Direct3D library from the Microsoft Corporation. In some embodiments, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client 902 of the command, a command operation code (opcode) 904, and the relevant data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B shows an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930 or the media pipeline 924 beginning at the media pipeline state 940.

The commands to configure the 3D pipeline state 930 include 3D state setting commands for vertex buffer state, vertex element state, constant color state, depth buffer state, and other state variables that are to be configured before 3D primitive commands are processed. The values of these commands are determined at least in part based on the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment, command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of commands to configure the media pipeline state 940 are dispatched or placed into a command queue before the media object commands 942. In some embodiments, media pipeline state commands 940 include data to configure the media pipeline elements that will be used to process the media objects. This includes data to configure the video decode and video encode logic within the media pipeline, such as encode or decode format. In some embodiments, media pipeline state commands 940 also support the use of one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
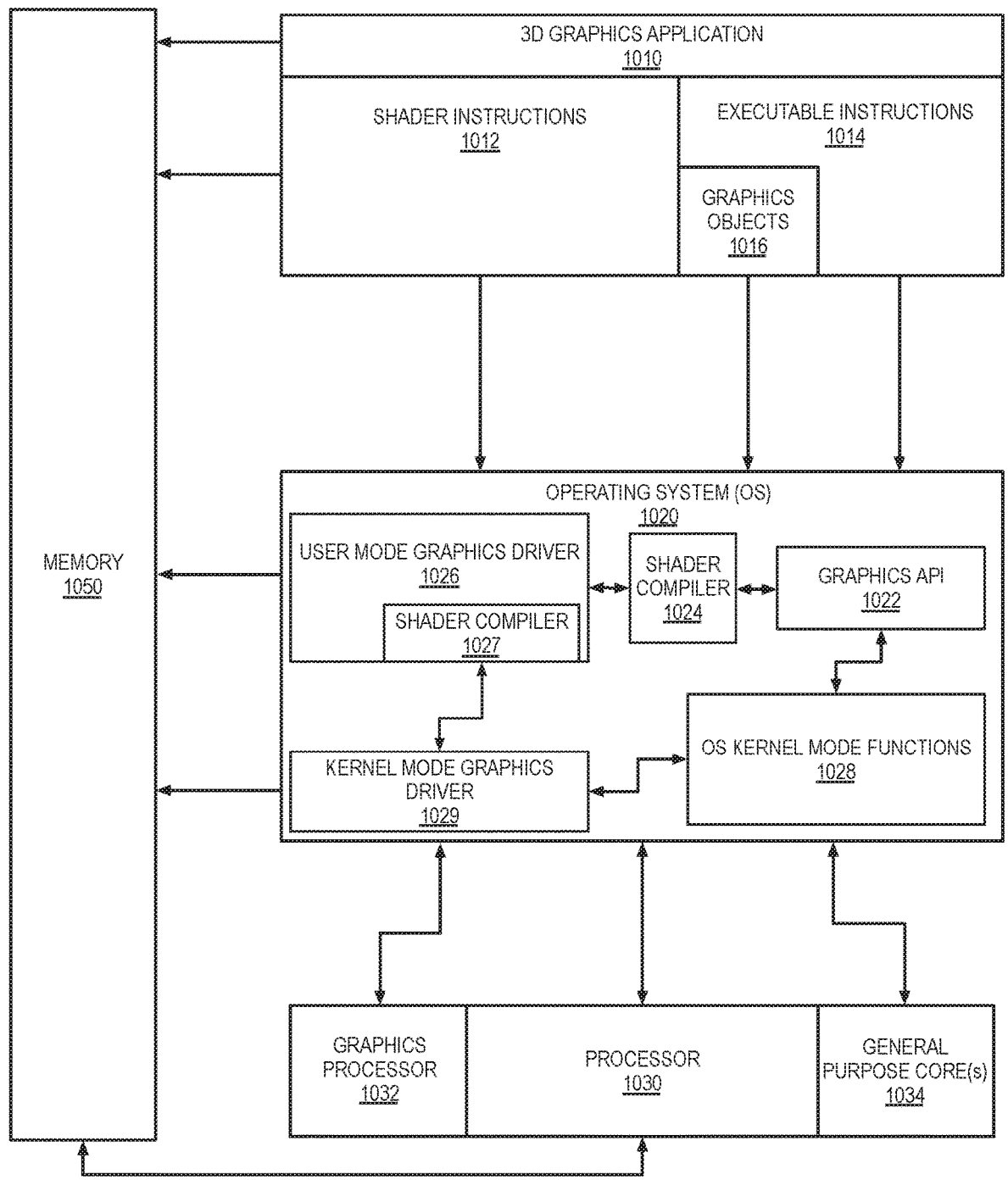
FIG. 10 illustrates exemplary graphics software architecture for a data processing system according to some embodiments.

FIG. 10 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. The operating system 1020 can support a graphics API 1022 such as the Direct3D API, the OpenGL API, or the Vulkan API. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010. In some embodiments, the shader instructions 1012 are provided in an intermediate form, such as a version of the Standard Portable Intermediate Representation (SPIR) used by the Vulkan API.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11:
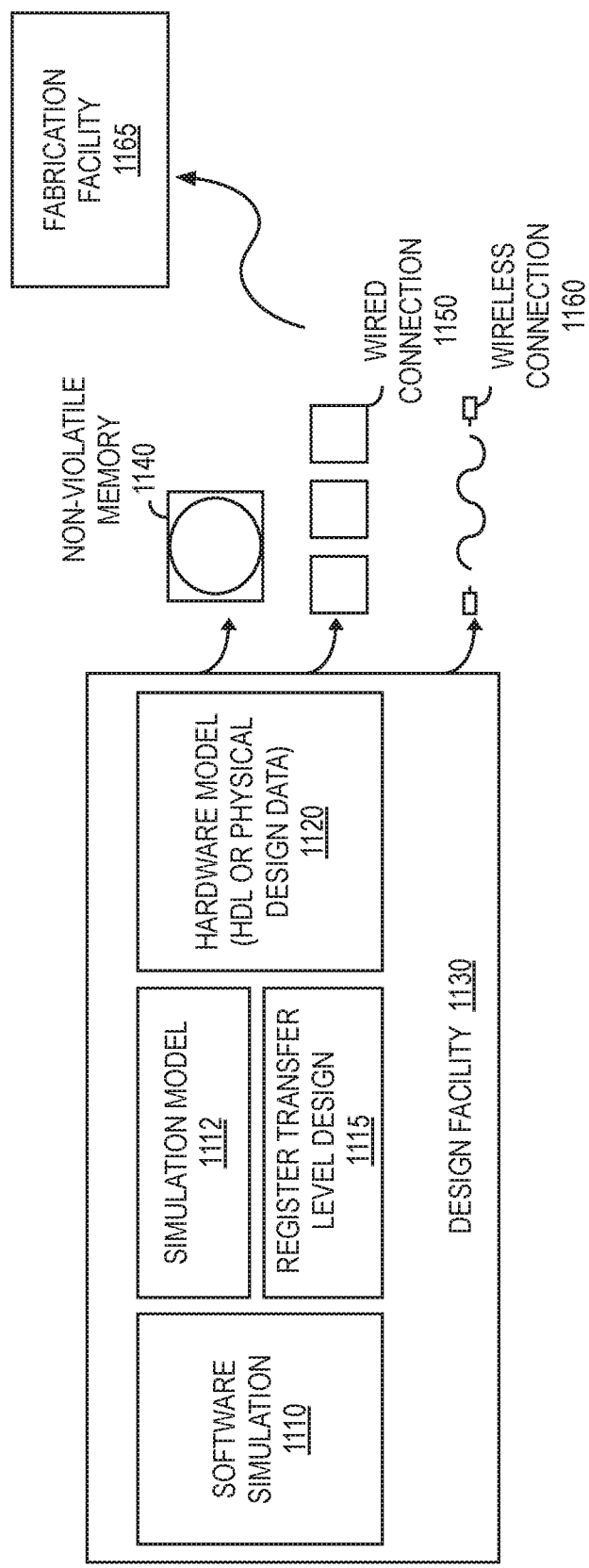
FIG. 11 is a block diagram illustrating an IP core development system that may be used to manufacture an integrated circuit to perform operations according to an embodiment.

FIG. 11 is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high level programming language (e.g., C/C++). The software simulation 1110 can be used to design, test, and verify the behavior of the IP core using a simulation model 1112. The simulation model 1112 may include functional, behavioral, and/or timing simulations. A register transfer level (RTL) design 1115 can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a 3$^{rd}$ party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Exemplary System on a Chip Integrated Circuit

Figure 12:
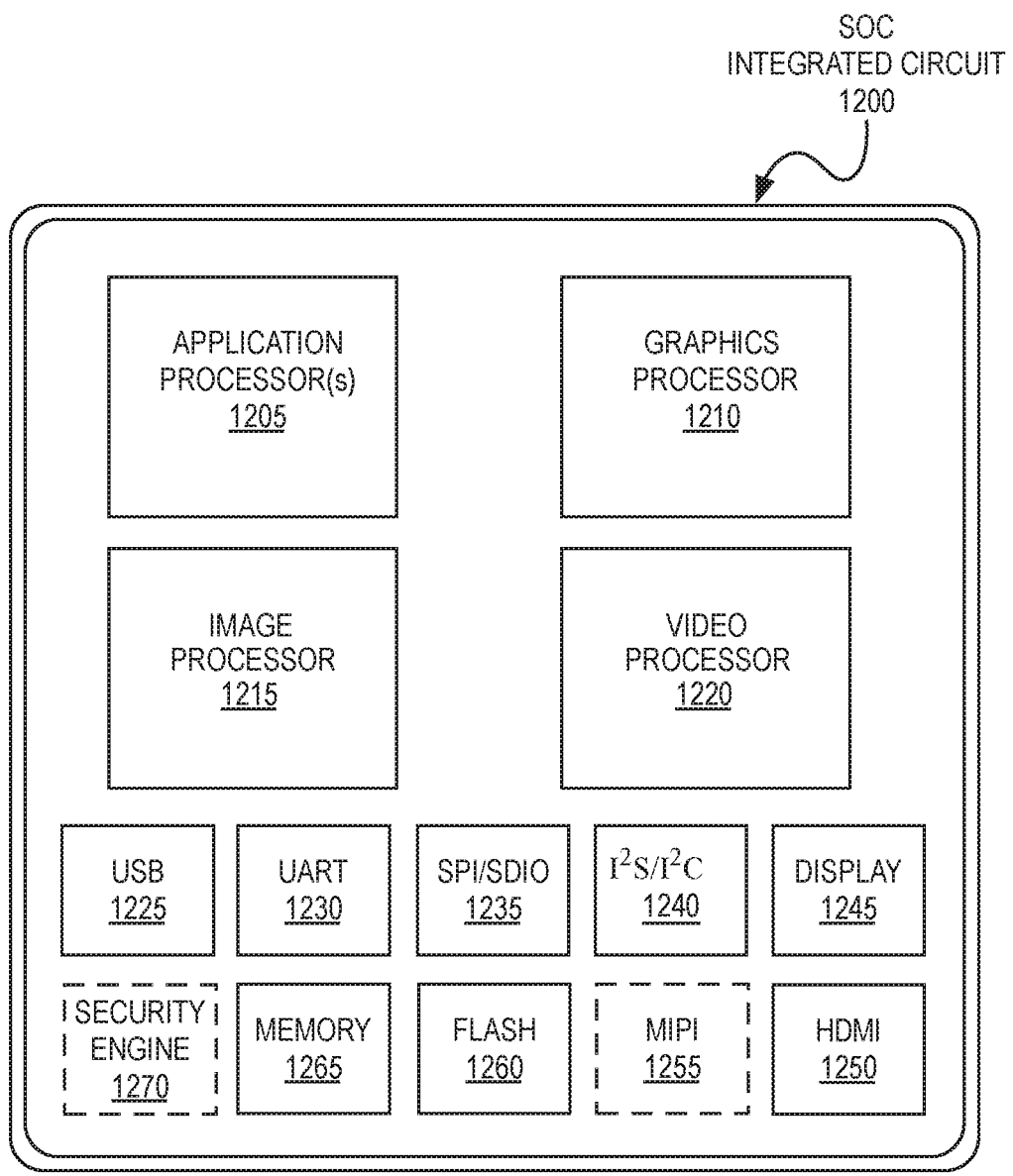
FIG. 12 is a block diagram illustrating an exemplary system on a chip integrated circuit that may be fabricated using one or more IP cores, according to an embodiment.
Figure 13:
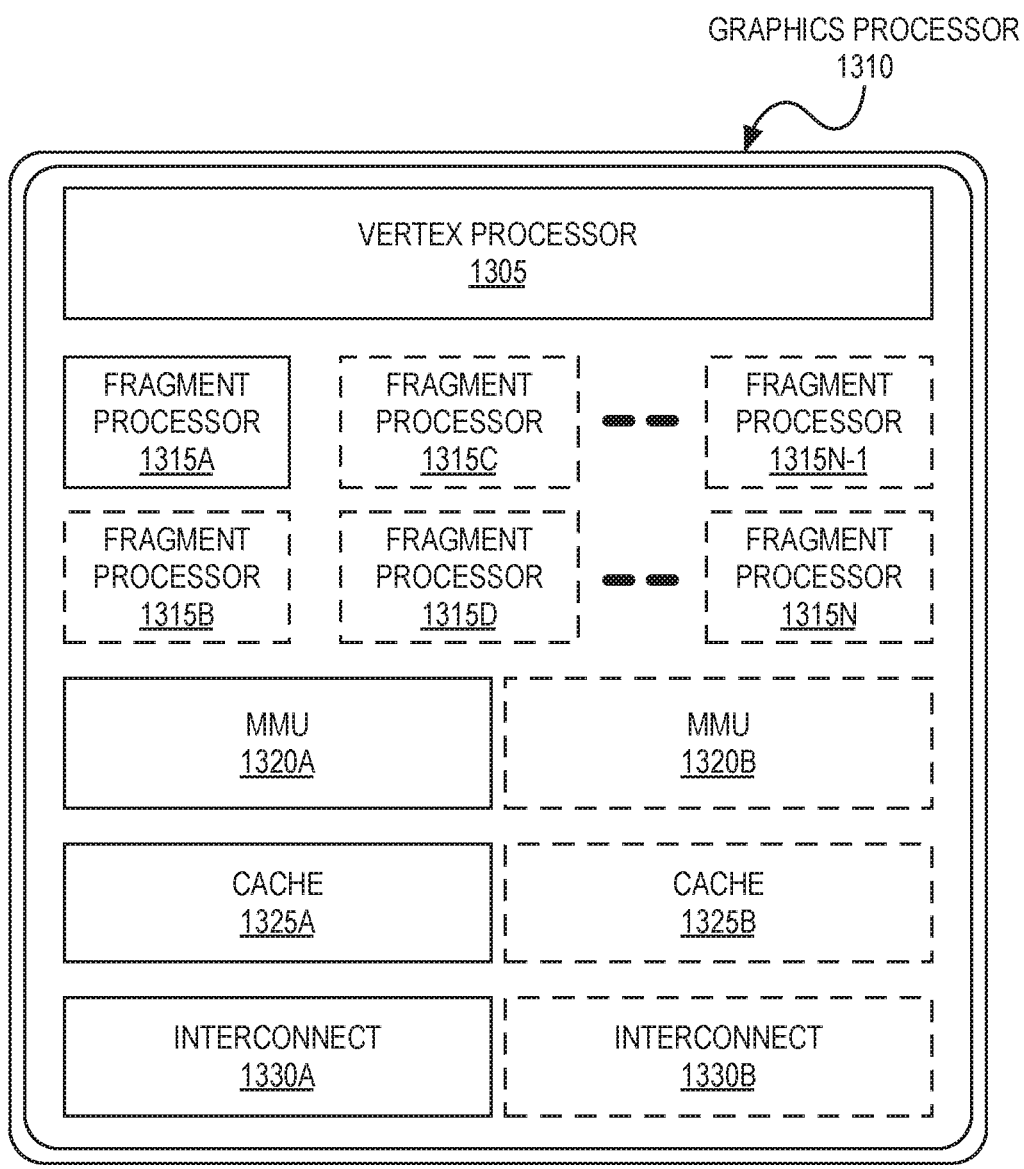
FIG. 13 is a block diagram illustrating an exemplary graphics processor of a system on a chip integrated circuit that may be fabricated using one or more IP cores, according to an embodiment.
Figure 14:
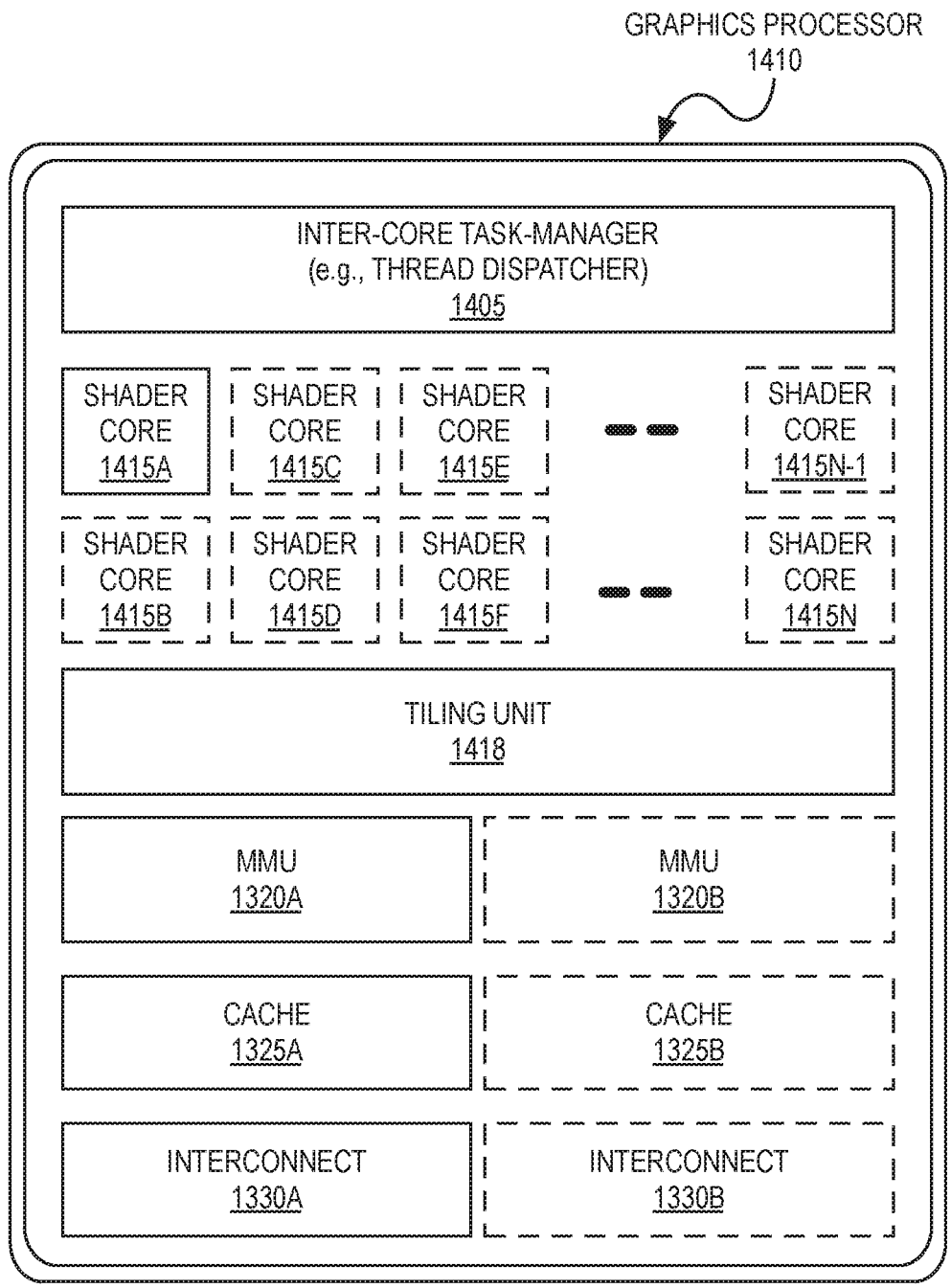
FIG. 14 is a block diagram illustrating an additional exemplary graphics processor of a system on a chip integrated circuit that may be fabricated using one or more IP cores, according to an embodiment.

FIGS. 12-14 illustrated exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general purpose processor cores.

FIG. 12 is a block diagram illustrating an exemplary system on a chip integrated circuit 1200 that may be fabricated using one or more IP cores, according to an embodiment. Exemplary integrated circuit 1200 includes one or more application processor(s) 1205 (e.g., CPUs), at least one graphics processor 1210, and may additionally include an image processor 1215 and/or a video processor 1220, any of which may be a modular IP core from the same or multiple different design facilities. Integrated circuit 1200 includes peripheral or bus logic including a USB controller 1225, UART controller 1230, an SPI/SDIO controller 1235, and an I$^2$S/I$^2$C controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

FIG. 13 is a block diagram illustrating an exemplary graphics processor 1310 of a system on a chip integrated circuit that may be fabricated using one or more IP cores, according to an embodiment. Graphics processor 1310 can be a variant of the graphics processor 1210 of FIG. 12. Graphics processor 1310 includes a vertex processor 1305 and one or more fragment processor(s) 1315A 1315N (e.g., 1315A, 1315B, 1315C, 1315D, through 1315N-1, and 1315N). Graphics processor 1310 can execute different shader programs via separate logic, such that the vertex processor 1305 is optimized to execute operations for vertex shader programs, while the one or more fragment processor(s) 1315A-1315N execute fragment (e.g., pixel) shading operations for fragment or pixel shader programs. The vertex processor 1305 performs the vertex processing stage of the 3D graphics pipeline and generates primitives and vertex data. The fragment processor(s) 1315A-1315N use the primitive and vertex data generated by the vertex processor 1305 to produce a framebuffer that is displayed on a display device. In one embodiment, the fragment processor(s) 1315A-1315N are optimized to execute fragment shader programs as provided for in the OpenGL API, which may be used to perform similar operations as a pixel shader program as provided for in the Direct 3D API.

Graphics processor 1310 additionally includes one or more memory management units (MMUs) 1320A-1320B, cache(s) 1325A-1325B, and circuit interconnect(s) 1330A-1330B. The one or more MMU(s) 1320A-1320B provide for virtual to physical address mapping for integrated circuit 1310, including for the vertex processor 1305 and/or fragment processor(s) 1315A-1315N, which may reference vertex or image/texture data stored in memory, in addition to vertex or image/texture data stored in the one or more cache(s) 1325A-1325B. In one embodiment the one or more MMU(s) 1325A-1325B may be synchronized with other MMUs within the system, including one or more MMUs associated with the one or more application processor(s) 1205, image processor 1215, and/or video processor 1220 of FIG. 12, such that each processor 1205-1220 can participate in a shared or unified virtual memory system. The one or more circuit interconnect(s) 1330A-1330B enable graphics processor 1310 to interface with other IP cores within the SoC, either via an internal bus of the SoC or via a direct connection, according to embodiments.

FIG. 14 is a block diagram illustrating an additional exemplary graphics processor 1410 of a system on a chip integrated circuit that may be fabricated using one or more IP cores, according to an embodiment. Graphics processor 1410 can be a variant of the graphics processor 1210 of FIG. 12. Graphics processor 1410 includes the one or more MMU(s) 1320A-1320B, caches 1325A-1325B, and circuit interconnects 1330A-1330B of the integrated circuit 1300 of FIG. 13.

Graphics processor 1410 includes one or more shader core(s) 1415A-1415N (e.g., 1415A, 1415B, 1415C, 1415D, 1415E, 1415F, through 1315N-1, and 1315N), which provides for a unified shader core architecture in which a single core or type or core can execute all types of programmable shader code, including shader program code to implement vertex shaders, fragment shaders, and/or compute shaders. The exact number of shader cores present can vary among embodiments and implementations. Additionally, graphics processor 1410 includes an inter-core task manager 1405, which acts as a thread dispatcher to dispatch execution threads to one or more shader cores 1415A-1415N and a tiling unit 1418 to accelerate tiling operations for tile-based rendering, in which rendering operations for a scene are subdivided in image space, for example to exploit local spatial coherence within a scene or to optimize use of internal caches.

Figure 15:
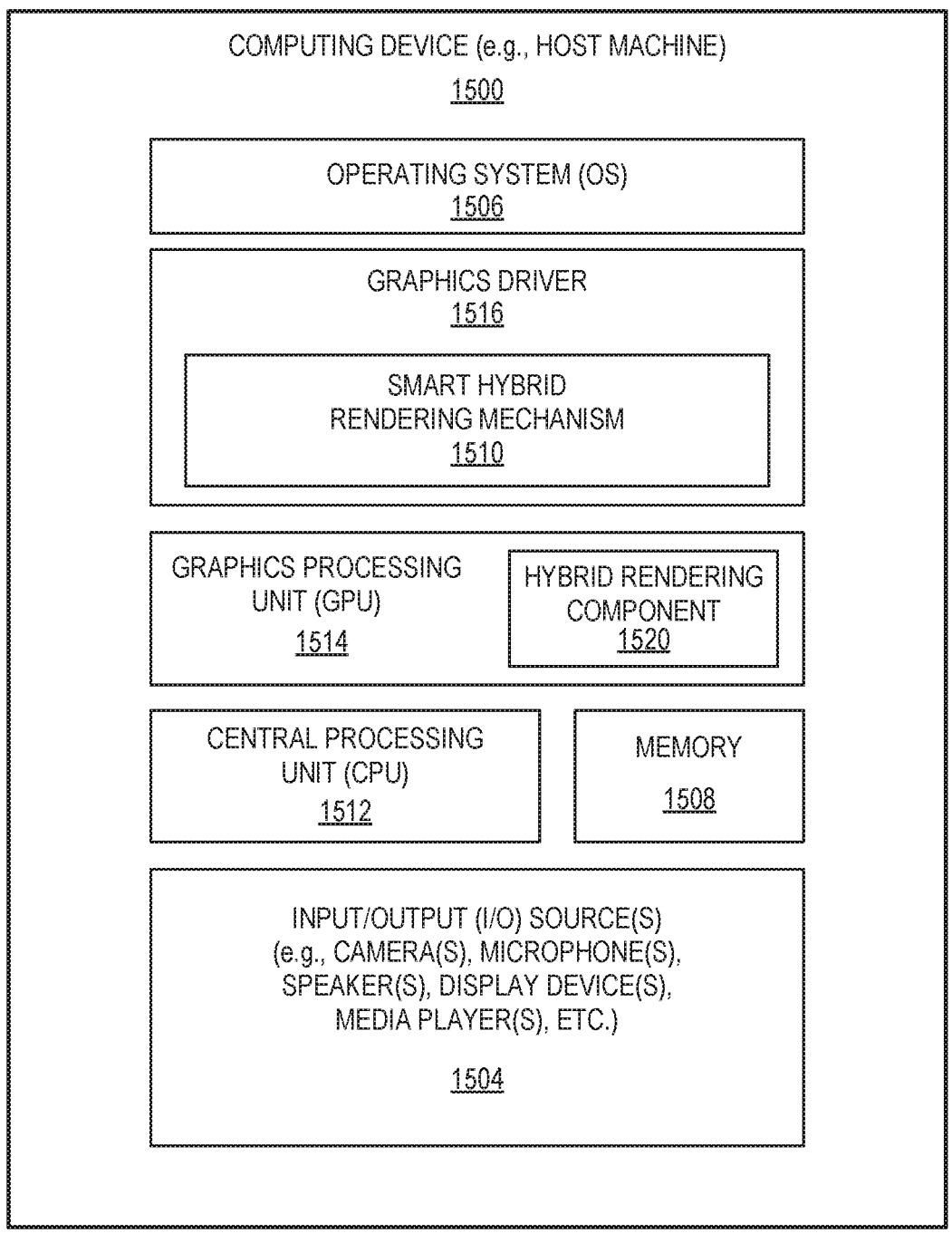
FIG. 15 illustrates a computing device employing a smart hybrid rendering mechanism according to one embodiment.

FIG. 15 illustrates a computing device 1500 employing a smart hybrid rendering mechanism ("hybrid mechanism") 1510 according to one embodiment. Computing device 1500 (e.g., smart wearable devices, virtual reality (VR) devices, head-mounted display (HMDs), mobile computers, Internet of Things (IoT) devices, laptop computers, desktop computers, server computers, etc.) may be the same as data processing system 100 of FIG. 1 and accordingly, for brevity, clarity, and ease of understanding, many of the details stated above with reference to FIGS. 1-14 are not further discussed or repeated hereafter. As illustrated, in one embodiment, computing device 1500 is shown as hosting hybrid mechanism 1510.

In the illustrated embodiment, hybrid mechanism 1510 is shown as being hosted by graphics driver 1516; however, it is contemplated that embodiments are not limited as such. For example, in one embodiment, hybrid mechanism 1510 may be part of firmware of graphics processing unit ("GPU" or "graphics processor") 1514 or central processing unit ("CPU" or "application processor") 1512, in another embodiment, hosted by operating system 1506. In yet another embodiment, hybrid mechanism 1510 may be a hardware component hosted by GPU 1514 or CPU 1512. In yet another embodiment, hybrid mechanism 1510 may be partially and simultaneously hosted by multiple components of computing device 1500, such as one or more of graphics driver 1516, GPU 1514, GPU firmware, CPU 1512, CPU firmware, operating system 1506, and/or the like. In yet another embodiment, hybrid mechanism 1510 may be installed or implemented as new hardware or by modifying existing hardware at GPU 1514, as shown with respect to FIG. 18B, where this new and/or modified hardware serves as hardware-based hybrid rendering component 1520 to perform as hybrid mechanism 1510.

It is contemplated and to be noted that hybrid mechanism 1510 is not merely applicable to or usable with graphics memory buffer or workloads having tasks relating to GPU 1514 and that it is equally applicable to or usable with any other memory buffers or workloads having tasks, such as relating to CPU 1512 and/or any number and type of other components of computing device 1500. However, for the sake of brevity and clarity, throughout this document, hybrid mechanism 1510 is described with reference to graphics buffers but it is to be noted that embodiments are not limited as such.

Throughout the document, term "user" may be interchangeably referred to as "viewer", "observer", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

Computing device 1500 may include any number and type of communication devices, such as large computing systems, such as server computers, desktop computers, etc., and may further include set-top boxes (e.g., Internet-based cable television set-top boxes, etc.), global positioning system (GPS)-based devices, etc. Computing device 1500 may include mobile computing devices serving as communication devices, such as cellular phones including smartphones, personal digital assistants (PDAs), tablet computers, laptop computers, e-readers, smart televisions, television platforms, wearable devices (e.g., glasses, watches, bracelets, smartcards, jewelry, clothing items, etc.), media players, etc. For example, in one embodiment, computing device 1500 may include a mobile computing device employing a computer platform hosting an integrated circuit ("IC"), such as system on a chip ("SoC" or "SOC"), integrating various hardware and/or software components of computing device 1500 on a single chip.

As illustrated, in one embodiment, computing device 1500 may include any number and type of hardware and/or software components, such as (without limitation) GPU 1514, graphics driver (also referred to as "GPU driver", "graphics driver logic", "driver logic", user-mode driver (UMD), UMD, user-mode driver framework (UMDF), UMDF, or simply "driver") 1516, CPU 1512, memory 1508, network devices, drivers, or the like, as well as input/output (I/O) sources 1504, such as touchscreens, touch panels, touch pads, virtual or regular keyboards, virtual or regular mice, ports, connectors, etc. Computing device 1500 may include operating system (OS) 1506 serving as an interface between hardware and/or physical resources of the computer device 1500 and a user. It is contemplated that CPU 1512 may include one or more processors, such as processor(s) 102 of FIG. 1, while GPU 1514 may include one or more graphics processors, such as graphics processor(s) 108 of FIG. 1.

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

It is contemplated and as further described with reference to FIGS. 1-12, some processes of the graphics pipeline as described above are implemented in software, while the rest are implemented in hardware. A graphics pipeline may be implemented in a graphics coprocessor design, where CPU 1512 is designed to work with GPU 1514 which may be included in or co-located with CPU 1512. In one embodiment, GPU 1514 may employ any number and type of conventional software and hardware logic to perform the conventional functions relating to graphics rendering as well as novel software and hardware logic to execute any number and type of instructions, such as instructions 121 of FIG. 1, to perform the various novel functions of hybrid mechanism 1510 as disclosed throughout this document.

As aforementioned, memory 1508 may include a random access memory (RAM) comprising application database having object information. A memory controller hub, such as memory controller hub 116 of FIG. 1, may access data in the RAM and forward it to GPU 1514 for graphics pipeline processing. RAM may include double data rate RAM (DDR RAM), extended data output RAM (EDO RAM), etc. CPU 1512 interacts with a hardware graphics pipeline, as illustrated with reference to FIG. 3, to share graphics pipelining functionality. Processed data is stored in a buffer in the hardware graphics pipeline, and state information is stored in memory 1508. The resulting image is then transferred to I/O sources 1504, such as a display component, such as display device 320 of FIG. 3, for displaying of the image. It is contemplated that the display device may be of various types, such as Cathode Ray Tube (CRT), Thin Film Transistor (TFT), Liquid Crystal Display (LCD), Organic Light Emitting Diode (OLED) array, etc., to display information to a user.

Memory 1508 may comprise a pre-allocated region of a buffer (e.g., frame buffer); however, it should be understood by one of ordinary skill in the art that the embodiments are not so limited, and that any memory accessible to the lower graphics pipeline may be used. Computing device 1500 may further include input/output (I/O) control hub (ICH) 150 as referenced in FIG. 1, one or more I/O sources 1504, etc.

CPU 1512 may include one or more processors to execute instructions in order to perform whatever software routines the computing system implements. The instructions frequently involve some sort of operation performed upon data. Both data and instructions may be stored in system memory 1508 and any associated cache. Cache is typically designed to have shorter latency times than system memory 1508; for example, cache might be integrated onto the same silicon chip(s) as the processor(s) and/or constructed with faster static RAM (SRAM) cells whilst the system memory 1508 might be constructed with slower dynamic RAM (DRAM) cells. By tending to store more frequently used instructions and data in the cache as opposed to the system memory 1508, the overall performance efficiency of computing device 1500 improves. It is contemplated that in some embodiments, GPU 1514 may exist as part of CPU 1512 (such as part of a physical CPU package) in which case, memory 1508 may be shared by CPU 1512 and GPU 1514 or kept separated.

System memory 1508 may be made available to other components within the computing device 1500. For example, any data (e.g., input graphics data) received from various interfaces to the computing device 1500 (e.g., keyboard and mouse, printer port, Local Area Network (LAN) port, modem port, etc.) or retrieved from an internal storage element of the computer device 1500 (e.g., hard disk drive) are often temporarily queued into system memory 1508 prior to their being operated upon by the one or more processor(s) in the implementation of a software program. Similarly, data that a software program determines should be sent from the computing device 1500 to an outside entity through one of the computing system interfaces, or stored into an internal storage element, is often temporarily queued in system memory 1508 prior to its being transmitted or stored.

Further, for example, an ICH, such as ICH 130 of FIG. 1, may be used for ensuring that such data is properly passed between the system memory 1508 and its appropriate corresponding computing system interface (and internal storage device if the computing system is so designed) and may have bi-directional point-to-point links between itself and the observed I/O sources/devices 1504. Similarly, an MCH, such as MCH 116 of FIG. 1, may be used for managing the various contending requests for system memory 1508 accesses amongst CPU 1512 and GPU 1514, interfaces and internal storage elements that may proximately arise in time with respect to one another.

I/O sources 1504 may include one or more I/O devices that are implemented for transferring data to and/or from computing device 1500 (e.g., a networking adapter); or, for a large scale non-volatile storage within computing device 1500 (e.g., hard disk drive). User input device, including alphanumeric and other keys, may be used to communicate information and command selections to GPU 1514. Another type of user input device is cursor control, such as a mouse, a trackball, a touchscreen, a touchpad, or cursor direction keys to communicate direction information and command selections to GPU 1514 and to control cursor movement on the display device. Camera and microphone arrays of computer device 1500 may be employed to observe gestures, record audio and video and to receive and transmit visual and audio commands.

Computing device 1500 may further include network interface(s) to provide access to a network, such as a LAN, a wide area network (WAN), a metropolitan area network (MAN), a personal area network (PAN), Bluetooth, a cloud network, a mobile network (e.g., $3^{rd}$ Generation (3G), $4^{th}$ Generation (4G), etc.), an intranet, the Internet, etc. Network interface(s) may include, for example, a wireless network interface having antenna, which may represent one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Network interface(s) may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported. In addition to, or instead of, communication via the wireless LAN standards, network interface(s) may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) may include one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing device 1500 may vary from implementation to implementation depending upon numerous factors, such as price constraints, performance requirements, technological improvements, or other circumstances. Examples of the electronic device or computer system 1500 may include (without limitation) a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

FIG. 16 illustrates hybrid mechanism 1510 of FIG. 15 according to one embodiment. For brevity, many of the details already discussed with reference to FIGS. 1-15 are not repeated or discussed hereafter. In one embodiment, graphics driver 1516 may host hybrid mechanism 1510 having any number and type of components, such as (without limitations): detection/reception logic 1601; write/update logic 1603; hybrid application logic 1605; and communication/compatibility logic 1607.

Figure 18A:
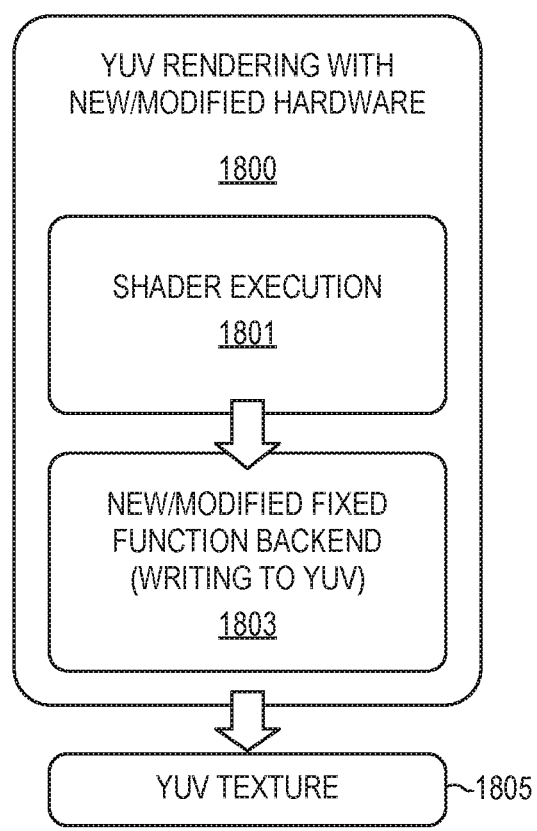
FIG. 18A illustrates a hardware-based luma and chrominance (YUV) rendering path in graphics pipeline according to one embodiment.
Figure 18B:
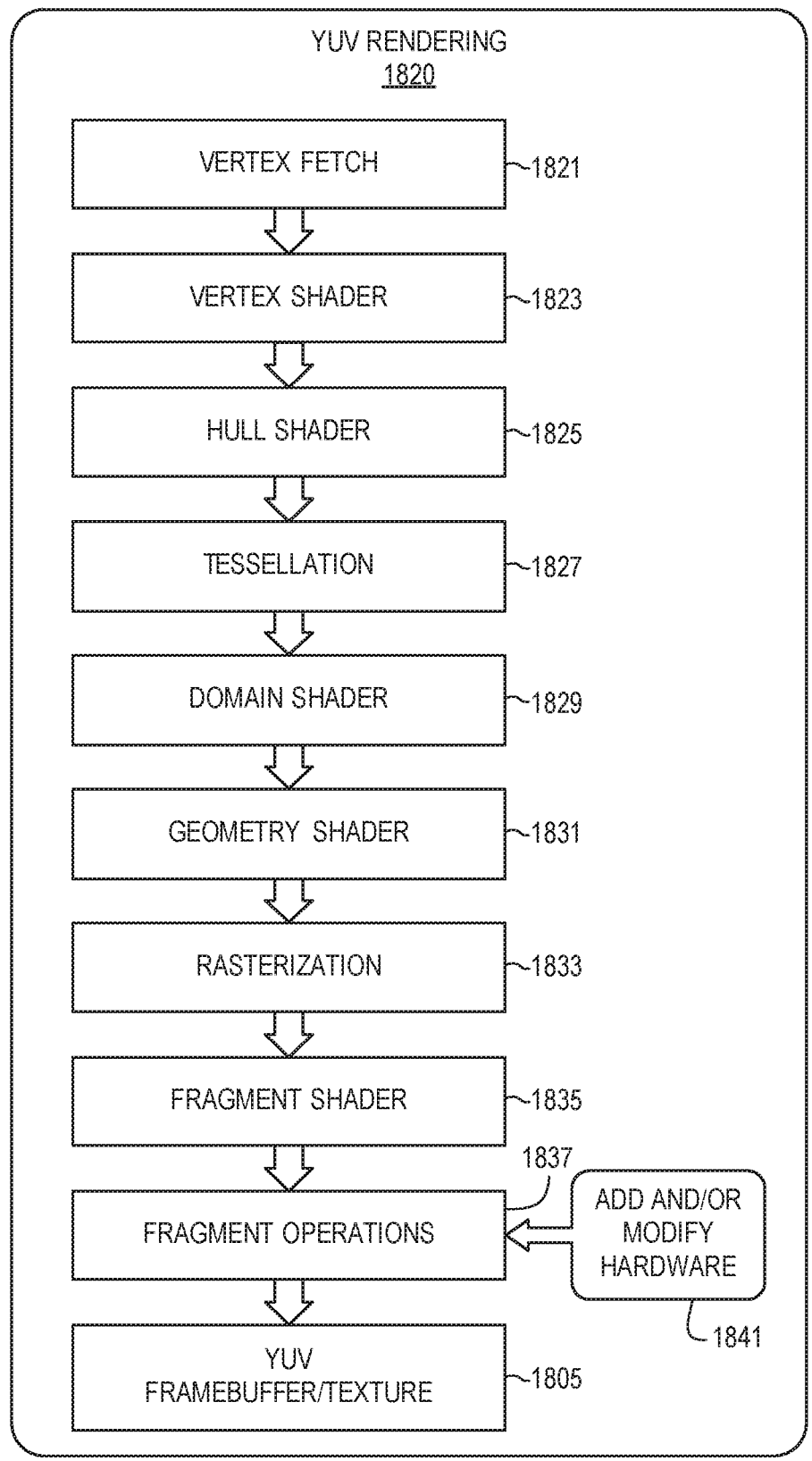
FIG. 18B illustrates a hardware-based YUV rendering path in graphics pipeline according to one embodiment.

In another embodiment, hybrid mechanism 1510 may be installed or implemented as new hardware or modified existing hardware at GPU 1514, as shown with respect to FIG. 18B, such as hybrid rendering component 1520 implemented as new and/or modified hardware in GPU 1514 to serve and perform as hybrid mechanism 1510.

Computing device 1500 is further shown to be in communication with one or more repositories, datasets, and/or databases, such as database(s) 1630 (e.g., cloud storage, non-cloud storage, etc.), where database(s) 1630 may reside at a local storage or a remote storage over communication medium(s) 1625, such as one or more networks (e.g., cloud network, proximity network, mobile network, intranet, Internet, etc.).

It is contemplated that a software application running at computing device 1500 may be responsible for performing or facilitating performance of any number and type of tasks using one or more components (e.g., GPU 1514, graphics driver 1516, CPU 1512, etc.) of computing device 1500. When performing such tasks, as defined by the software application, one or more components, such as GPU 1514, graphics driver 1516, CPU 1512, etc., may communicate with each other to ensure accurate and timely processing and completion of the tasks.

As previously described, in modern computing, various effects (e.g., 3D effects, enhancing effects, augmented reality, etc.) are added to image or video streams using, for example a 3D API (e.g., OpenGL®), etc. This process may be used for significant enhancement of videos, such as such as adding 3D effects to a two-dimensional (2D) video.

Figure 17A:
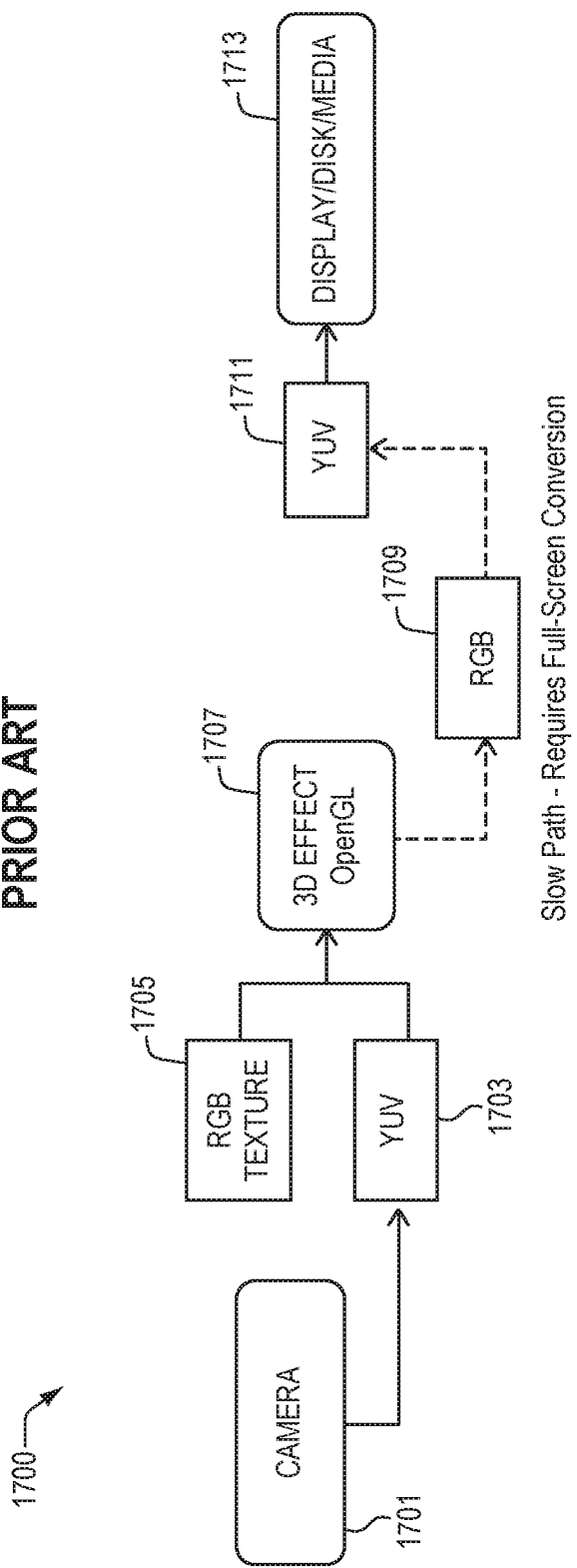
FIG. 17A illustrates a conventional red green blue (RGB) rendering-based slow path in video pipeline.

Conventionally, as illustrated with respect to FIG. 17A, an 2D YUV input image from a video stream may be loaded as an input for OpenGL® and then processed in an RGB color space to produce a corresponding RGB texture that is then converted back into YUV texture to produce an 3D YUV output image to a video output. A YUV layout can differ from an RGB layout such that UV channels may have different frequency from a Y channel and further, the UV channels are typically stored in different plane(s) and thus, the color storage accesses several non-contiguous memory locations.

In one embodiment, a YUV format is directly rendered from a 3D API, such as OpenGL®, with a single pass for rendering and without any additional hardware, where, for example, the Y channel is rendered using an existing pixel backend, while the UV channels are written using a store command (e.g., unordered access view (UAV) store command) using existing UAV capabilities. This novel single pass rendering technique increases performance and saves a substantial amount of bandwidth, such as when compared with the conventional two-pass rendering. A UAV may refer to a view of unordered access resource, such as buffers, textures, texture arrays, etc., that allows for temporary unordered read/write access from multiple threads. OpenGL® refers to a cross-language, cross-platform API for rendering 2D and 3D vector graphics. For example, "UAV" or "unordered access view" may relate to DirectX®, while it may be referred to as "image textures" when relating to OpenGL®. In either case, such as whether UAVs or image textures, they refer to a mechanism that allows for writing to arbitrary locations in certain resources from within a shader. It is contemplated that throughout this document, UAV and image texture may be referenced interchangeably and embodiments are not limited as such.

It is contemplated and noted that although throughout this document, a camera is used an input source for YUV images, embodiments are not merely limited to cameras. For example, it is contemplated, that any number and type of sources, such as I/O sources 1504 of FIG. 15, files, software programs, etc., may be used to serve as input sources. For example, it is contemplated that various compression algorithms use YUV formats, so the input or input source can be a decoded video file, a photo editing program, and/or the like. This novel technique is, however, applicable to and usable with any YUV image, regardless of the origin or source.

It is contemplated and as illustrated with reference to FIG. 20C, a number processes may be performed at various stages within a graphics pipeline relating to a software application running at or being hosted by computing device 100, where such processes may include (without limitation) vertex fetching, vertex shading, hull shading, tessellation, domain shading, geometry shading, rasterization, fragment shading, fragment operations, etc., where some of these processing, such as vertex fetching, tessellation, rasterization, fragment operations may be regarded as fixed function stage processes, while the rest of the aforementioned process may be regarded as programmable stage processes.

In one embodiment, detection/reception logic 1601 may be used to a video stream captured by one or more camera(s) of I/O source(s) 1504 of FIG. 15, where this video stream may include any number and type of 2D images needing 3D effects. Further, in one embodiment, detection/reception logic 1601 may be used to detect various graphics pipeline stages, such as the process of fragment shading relating to the application, where any number and type of instructions may be added to the fragment shader to computing their corresponding addresses, where these instructions may be added to fragment shader using write/update logic 1603. For example, this novel hybrid technique allows for manipulating the existing backend into considering it is using an R8 render target so it merely needs to write a red channel out which, for YUV texture, coincide with the Y-plane. Now since the U-plane and the V-plane need to be updated, in one embodiment, once the addresses have been computed, write/update logic 1603 may be triggered to update the UV-planes by adding the relevant addresses to be UV-planes and update their values accordingly, while the application remains entirely oblivious to these processes.

In one embodiment, the instructions instruct the graphics hardware, such as GPU 1512, to write the UV plane to the output texture (such as render target), where the instructions are added to the pixel shader as part of the shader compilation phase of graphics driver 1516. In one embodiment, the relevant addresses may refer to the locations in memory that capable of being written to, where the calculation is derived from the resource's (render target dimensions and actual color format.

Similarly, in one embodiment, a pixel backend is part of the hardware graphics pipeline, such as render output pipeline 870 of FIG. 8, that may be responsible for taking the pixel shader's output values and writing them onto the render target source.

For example, existing UAV or image texture capabilities may be used because the existing background is not capable of writing to multiple planes (of the same texture), but that UAVs or image textures may be used to write an arbitrary address within a texture as facilitated by write/update logic 1603. Since this capability may come with some performance cost, in one embodiment, the backend for the Y-plane is used.

In adding instructions to the fragment shader as facilitated by write/update logic 1603, the pipelines processes continue on with fragment operation and subsequently, in one embodiment, hybrid application logic 1605 may be used to execute the hybrid of Y-plane and UV-planes to produce YUV texture with a single pass, such as without having to perform any RGB processing, as well as without having to add or modify any graphics hardware.

Once the YUV texture is obtained, it is then processed into transforming into 3D YUV output images that are then rendered using one or more of display and/or media devices of I/O source(s) 1504 of FIG. 15 for displaying or playing the YUV output images.

It is contemplated and to be noted that although U-plane and V-plane may be interleaved and written in a single UAV operation, as described and referenced throughout this document, embodiments are not limited as such. For example, U-planed and V-plane may be stored in separate planes and in that case, there may be two UAV write operations instead of just one.

Communication/compatibility logic 1607 may be used to facilitate dynamic communication and compatibility between computing device 1500 and any number and type of other computing devices (such as mobile computing device, desktop computer, server computing device, etc.); processing devices or components (such as CPUs, GPUs, etc.); capturing/sensing/detecting devices (such as capturing/sensing components including cameras, depth sensing cameras, camera sensors, red green blue (RGB) sensors, microphones, etc.); display devices (such as output components including display screens, display areas, display projectors, etc.); user/context-awareness components and/or identification/verification sensors/devices (such as biometric sensors/detectors, scanners, etc.); database(s) 1630, such as memory or storage devices, databases, and/or data sources (such as data storage devices, hard drives, solid-state drives, hard disks, memory cards or devices, memory circuits, etc.); communication medium(s) 1625, such as one or more communication channels or networks (e.g., Cloud network, the Internet, intranet, cellular network, proximity networks, such as Bluetooth, Bluetooth low energy (BLE), Bluetooth Smart, Wi-Fi proximity, Radio Frequency Identification (RFID), Near Field Communication (NFC), Body Area Network (BAN), etc.); wireless or wired communications and relevant protocols (e.g., Wi-Fi®, WiMAX, Ethernet, etc.); connectivity and location management techniques; software applications/websites (e.g., social and/or business networking websites, etc., business applications, games and other entertainment applications, etc.); and programming languages, etc., while ensuring compatibility with changing technologies, parameters, protocols, standards, etc.

Throughout this document, terms like "logic", "component", "module", "framework", "engine", "mechanism", and the like, may be referenced interchangeably and include, by way of example, software, hardware, and/or any combination of software and hardware, such as firmware. In one example, "logic" may refer to or include a software component that is capable of working with one or more of an operating system (e.g., operating system 1506), a graphics driver (e.g., graphics driver 1516), etc., of a computing device, such as computing device 1500. In another example, "logic" may refer to or include a hardware component that is capable of being physically installed along with or as part of one or more system hardware elements, such as an application processor (e.g., CPU 1512), a graphics processor (e.g., GPU 1514), etc., of a computing device, such as computing device 1500. In yet another embodiment, "logic" may refer to or include a firmware component that is capable of being part of system firmware, such as firmware of an application processor (e.g., CPU 1512) or a graphics processor (e.g., GPU 1514), etc., of a computing device, such as computing device 1500.

Further, any use of a particular brand, word, term, phrase, name, and/or acronym, such as "GPU", "GPU domain", "GPGPU", "CPU", "CPU domain", "graphics driver", "workload", "application", "graphics pipeline", "pipeline processes", "Y-plane", "UV-plane", "YUV", "RGB", "API", "3D API", "OpenGL®", "DirectX®", "fragment shader", "YUV texture", "shader execution", "existing UAV capabilities", "existing backend", "hardware", "software", "agent", "graphics driver", "kernel mode graphics driver", "user-mode driver", "user-mode driver framework", "buffer", "graphics buffer", "allocation component", "allocation driver", "composition buffer", "purge" or "purging", "realize" or "realizing", "task", "operation", "software application", "game", etc., should not be read to limit embodiments to software or devices that carry that label in products or in literature external to this document.

It is contemplated that any number and type of components may be added to and/or removed from hybrid mechanism 1510 to facilitate various embodiments including adding, removing, and/or enhancing certain features. For brevity, clarity, and ease of understanding of hybrid mechanism 1510, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

FIG. 17A illustrates a conventional RGB rendering-based slow path in video pipeline 1700. For brevity, many of the details previously discussed with reference to FIGS. 1-16 may not be discussed or repeated hereafter. In the illustrated example, video pipeline 1700 begins with camera 1701 capturing and providing a video stream, such as a 2D video stream, of input 2D YUV format 1703 that is to be presented as in output 3D YUV format 1711 to be displayed/played by display or media device 1713. As illustrated, any 3D effects are to be added by using 3D effect OpenGL® 1707 which then returns output YUV format 1711; however, not without first taking a slow detour to perform RGB rendering of RGB texture output 1709 which requires a full-screen conversion using the added RGB texture 1705. In other words, in order to return OpenGL® output of YUV format 1711 to the media pipeline, such as display/media device 1713, first a conversion to RGB output 1709 is needed before that can be converted back into YUV format output 1711.

Figure 17B:
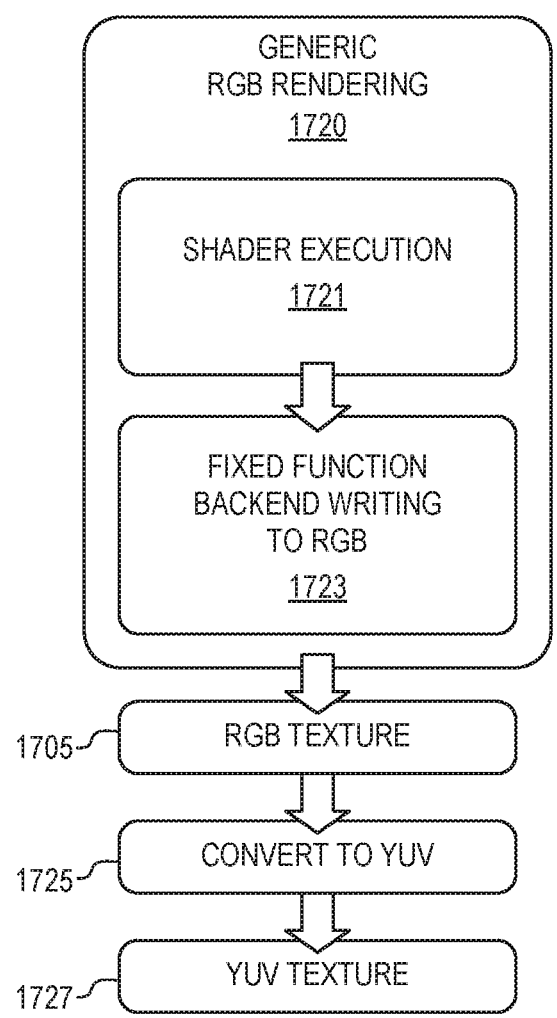
FIG. 17B illustrates a conventional RGB rendering-based slow path in graphics pipeline.

FIG. 17B illustrates a conventional RGB rendering-based slow path in graphics pipeline 1720. For brevity, many of the details previously discussed with reference to FIGS. 1-17A may not be discussed or repeated hereafter. As illustrated, shader execution 1721 is followed by fixed function backend 1723 for writing to RGB. As previously shown with respect to FIG. 17A, RGB texture 1705 is then added to the process, followed by YUV conversion 1725 and the resulting YUV texture 1727 to provide YUV output 1711 of FIG. 17A.

Figure 17C:
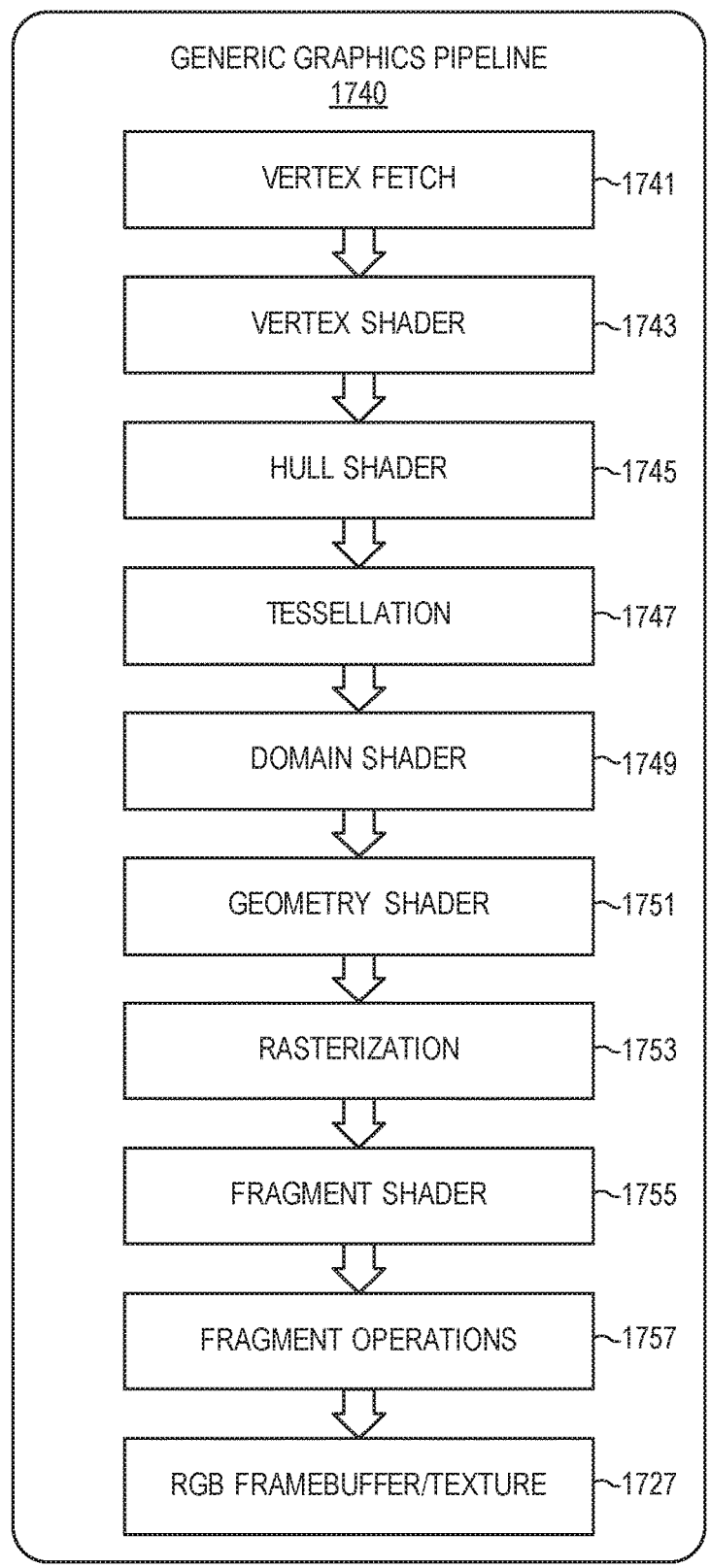
FIG. 17C illustrates a conventional RGB rendering-based slow path in graphics pipeline.

FIG. 17C illustrates a conventional RGB rendering-based slow path in graphics pipeline 1740. For brevity, many of the details discussed previously discussed with reference to FIGS. 1-17B may not be discussed or repeated hereafter. As illustrated, graphics pipeline 1740 includes various processing stages that are performed by various components, where these stages are shown to include vertex fetch 1741, vertex shader 1743, hull shader 1745, tessellation 1747, domain shader 1749, geometry shader 1751, rasterization 1753, fragment shader 1755, and fragment operations 1757, which is followed by RGB processing to produce RGB framework/texture 1727. As illustrated with respect to FIGS. 17A-17B, this slow path then performs conversion of RGB texture 1727 into YUV texture to be used to render YUV images at display/media devices. This is referenced as a two-pass or two-path rendering, which is severely inefficient in terms of the use of valuable processing resources, such as resulting in waste of bandwidth and lowering of overall graphics performance.

FIG. 18A illustrates a hardware-based YUV rendering path in graphics pipeline 1800 according to one embodiment. For brevity, many of the details discussed previously discussed with reference to FIGS. 1-17C may not be discussed or repeated hereafter. As illustrated, in one embodiment, shader execution 1801 is performed, which may then be followed by the use of new or modified fixed function backend 1803 for writing to YUV, resulting in YUV texture 1805, where this new or fixed function backend 1803 is obtained or hosted by hardware-based hybrid rendering component 1520 of FIG. 15 by adding new graphics hardware and/or modifying the existing graphics hardware being used at the fragment operations stage of graphics pipeline 1800, as will be further shown with respect to FIG. 18B.

FIG. 18B illustrates a hardware-based YUV rendering path in graphics pipeline 1820 according to one embodiment. For brevity, many of the details discussed previously discussed with reference to FIGS. 1-18A may not be discussed or repeated hereafter. As previously described, this graphics pipeline 1820 includes various processing stages that are performed by various components, where these stages are shown to include vertex fetch 1821, vertex shader 1823, hull shader 1825, tessellation 1827, domain shader 1829, geometry shader 1821, rasterization 1823, fragment shader 1825, and fragment operations 1827, which is then followed by producing hardware-based YUV framebuffer/texture 1805.

As aforementioned with reference to FIG. 18A, YUV texture 1805 is produced by hardware-based hybrid rendering component 1520 of FIG. 15 capable of performing and serving as hybrid mechanism 1510 of FIG. 15, where this hybrid rendering component 1520 may be used as new fixed function backend 1803 of FIG. 18A, for writing to YUV, resulting in the desired output of the YUV texture. As previously described, this hybrid rendering component 1520 may be obtained by adding/modifying of graphics hardware 1841 of GPU 1514 of FIG. 15 to sufficiently modify the stage of fragment operations 1817 and its processes within graphics pipeline 1820.

Figure 19A:
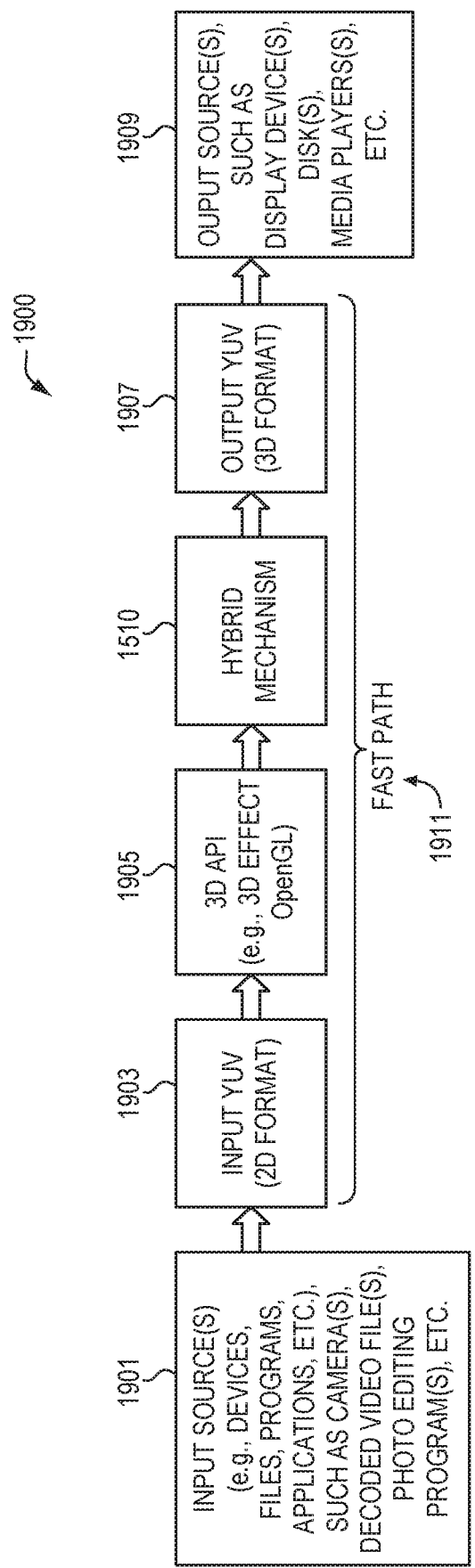
FIG. 19A illustrates a hybrid YUV rendering-based fast path of video pipeline associated with a software application at a computing device according to one embodiment.

FIG. 19A illustrates a hybrid YUV rendering-based fast path of video pipeline 1900 associated with a software application at a computing device according to one embodiment. For brevity, many of the details discussed previously discussed with reference to FIGS. 1-18B may not be discussed or repeated hereafter. Further, it is contemplated and to be noted that embodiments are not limited to any particular architectural setup or placement of components, such as video pipeline 1900.

In the illustrated example, video pipeline 1900 at a computing device, such as computing device 1500 of FIG. 15, begins with detecting an image or a video stream of images from input source(s) 1901, such as 2D video images, which are then forwarded as input 2D YUV format 1903 to a 3D API, such as 3D effect OpenGL® 1905, in order to add 3D effects to YUV format 1903. In one embodiment, camera 1701 may be part of I/O sources 1504 of computing device 1500 of FIG. 15.

It is contemplated and noted that although throughout this document, a camera is used an input source for YUV images, embodiments are not merely limited to cameras. For example, it is contemplated, that any number and type of sources, such as I/O sources 1504 of FIG. 15, files, software programs, etc., may be used to serve as input source(s) 1901. For example, it is contemplated that various compression algorithms use YUV formats, so the input or input source(s) 1901 may be a decoded video file, a photo editing program, and/or the like. This novel technique is, however, applicable to and usable with any YUV image, regardless of the origin or input source(s) 1901.

In one embodiment, as described with reference to FIG. 16, hybrid mechanism 1510 may be used to convert input 2D YUV format 1903 into a YUV texture-based output 3D YUV format 1907 of video images without having to take the double path involving RGB conversion of FIGS. 17A-17C. In other words, using hybrid mechanism 1510, YUV texture is generated to then produce this output 3D YUV format 1907 directly through a fast path without taking any detours for RGB conversion, where this hybrid-texture based output 3D YUV format 1907 is then used to facilitate displaying or playing of its resulting 3D video images through one or more display and/or media pipelines on to one or more output source(s) 1909 (e.g., display device(s), disk(s), media player(s), etc.), such as those of I/O sources 1504 of computing device 1500 of FIG. 15.

Figure 19B:
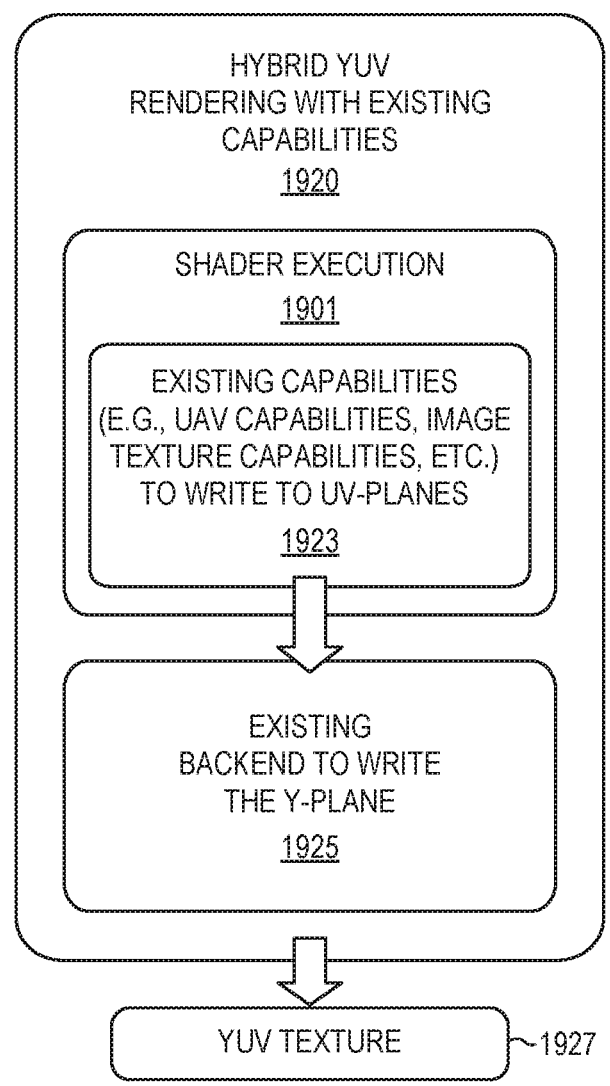
FIG. 19B illustrates a hybrid YUV rendering-based fast path of graphics pipeline associated with a software application at a computing device according to one embodiment.

FIG. 19B illustrates a hybrid YUV rendering-based fast path of graphics pipeline 1920 associated with a software application at a computing device according to one embodiment. For brevity, many of the details discussed previously discussed with reference to FIGS. 1-19A may not be discussed or repeated hereafter. Further, it is contemplated and to be noted that embodiments are not limited to any particular architectural setup or placement of components, such as graphics pipeline 1920.

In the illustrated embodiment, fast path-based graphics pipeline 1920 is shown as being capable of performing direct generation of YUV texture 1927 by using and putting together the existing graphics infrastructure, such as existing UAV or image texture components/capabilities 1923, existing backend 1925, etc., without having to take any detours to process RGB texture and perform conversions back to YUV texture or adding and/or modifying any of the graphics hardware to the graphics infrastructure. In one embodiment, graphics pipeline 1920 is capable of facilitating rendering of 3D YUV images of a video stream based on direct generation and use of YUV texture 1927 relating to a software application running at or hosted by a computing devices, such as computing device 1500 as facilitated by hybrid mechanism 1510 of FIG. 15. For example, as will be further illustrated with reference to FIG. 19C, upon detection and/or performance of programmable logic of shader execution 1921 of graphics pipeline 1920, in one embodiment, existing graphics capabilities, such as UAV or image texture capabilities 1923, may be used to write UV-planes of YUV-planes. Similarly, moving forward, in one embodiment, existing graphics backend 1925 may be used to write Y-plane of the YUV-planes. Subsequently, in one embodiment, to set of planes, such as the UV-planes and the Y-plane, are put together to generate YUV texture 1927 which may then be used to produce YUV-based 3D images of the video stream to be played or displayed using one or more of media players, display devices or screens, etc., of I/O components 1504 of computing device 1500 of FIG. 15.

Figure 19C:
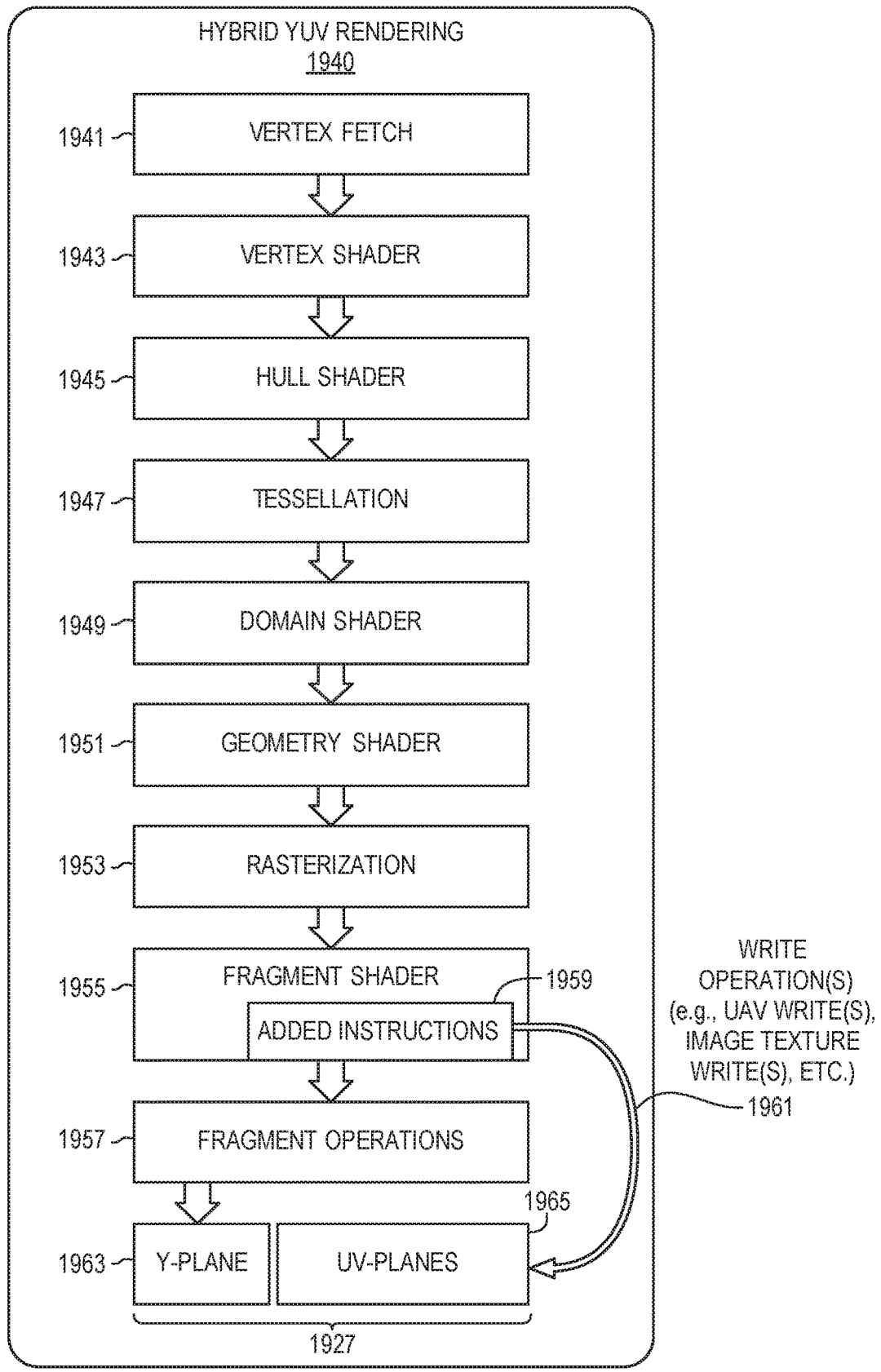
FIG. 19C illustrates a hybrid YUV rendering-based fast path of graphics pipeline associated with a software application at a computing device according to one embodiment.

It is contemplated that shader execution 1921 is regarded as programmable logic associated with the fragment shader stage of graphics pipeline 1920, such as fragment shader 1959 of FIG. 19C, while the existing UAV components or capabilities 1923 and backend 1925 are regarded as existing fixed functions of graphics processing and components associated with graphics pipeline 1920, while YUV texture 1909 is regarded as a texture resource produced through graphics pipeline 1920.

FIG. 19C illustrates a hybrid YUV rendering-based fast path of graphics pipeline 1940 associated with a software application at a computing device according to one embodiment. For brevity, many of the details discussed previously discussed with reference to FIGS. 1-19B may not be discussed or repeated hereafter. Further, it is contemplated and to be noted that embodiments are not limited to any particular architectural setup or placement of components, such as graphics pipeline 1940.

As an initial matter graphics pipeline 1940 may be same as or similar to and/or part of graphics pipeline 1920 of FIG. 19B and/or video pipeline 1900 of FIG. 19A. However, as aforementioned, for brevity and clarity, many of the processes and/or components discussed with reference to FIGS. 19B-19C and other preceding figures along with any other commonly known processes and/or components relating to graphics processing are not discussed or repeated here.

With that, in the illustrated embodiment, any number and type of stages 1941-1957 of graphics pipeline 1940 are shown, such as fixed function stages like vertex fetch 1941, tessellation 1947, rasterization 1953, and fragment operations 1957, and programmable stages like vertex shader 1943, hull shader 1945, domain shader 1949, geometry shader 1951, and fragment shader 1955, where graphics pipeline 1940 relates to a software application running at or hosted by a computing device, such as computing device 1500 of FIG. 15.

As illustrated here and previously discussed with reference to FIG. 16 and FIGS. 19A-19B, upon completion of a fixed function stage of rasterization 1953, detection/reception logic 1601 of FIG. 16 may detect a programmable stage of fragment shader 1955 and trigger write/update logic 1603 of FIG. 16 to write any number and type of instructions 1959 by adding them to this stage of fragment shader 1955. Once added, fragment shader 1955 may then use these added instructions 1959 to compute any number and type of relevant addresses corresponding to instructions 1959, where these relevant addresses are then written into UV-planes 1965. For example, using merely the existing UAV components/capabilities of the graphics infrastructure, UAV write 261 is performed to write UV-planes 1965, such as writing the relevant addresses to UV-planes 1965 and accordingly, updating any relevant values of UV-planes 1965.

In one embodiment, the instructions instruct the graphics hardware to perform write 261 to UV-plane to the output texture 1927 (such as render target), where instructions 1959 are added, as pseudo code, to the pixel shader as part of the shader compilation phase of fragment shader 1955. In one embodiment, the calculated relevant addresses may refer to various locations in memory, where the locations are capable of being written to, while this calculation of the relevant addresses is derived from the resource's render target dimensions and/or actual color format. Similarly, in one embodiment, a pixel backend is part of the hardware graphics pipeline, such as render output pipeline 870 of FIG. 8, that may be responsible for taking the pixel shader's output values and writing them onto the render target source.

It is contemplated and to be noted that although U-plane and V-plane may be interleaved, as UV-planes 1965, and written in a single UAV operation, such as a single UAV write 261, as described and referenced throughout this document, embodiments are not limited as such. For example, U-plane and V-plane may be stored in separate planes and in that case, there may be two UAV write operations instead of just one, such as multiple UAV writes 261.

Further, for example, the existing backend associated with Y-plane 1961 is manipulated into considering that it is using an R8 render target such that it writes out merely the red channel, which, for this YUV texture 1927, coincides with Y-plane 1961. In one embodiment, Y-plane 1963 and UV-planes 1965 are combined or put together to generate YUV texture 1927, as facilitated by hybrid application logic 1605 of FIG. 16, where this YUV texture 1927 is then rendered as a final output having 3D YUV images of the video stream to be played or displayed using one or more of media players, display screens, and/or the like. This generation and rendering of YUV texture 1927 and other relevant processes, such as using existing UAV capabilities and the existing backend to write to UV-planes 1965 and Y-plane 1965, are performed at the computing device without the knowledge of the software application running at the computing device, such as computing device 1500 of FIG. 15, such that the software application remains oblivious to it.

In one embodiment, the existing UAVs are used because typically, the existing backend is not regarded as designed for or capable of writing to multiple planes (of the same texture), but that UAVs may be used to write to an arbitrary address within a particular texture, such as YUV texture 1927, while any potential performance cost is also avoided by using the backend associated with Y-plane 1961. By using this hybrid approach, better performance is achieved such that as opposed to simply using the UAVs and the backend is also kept in use, which can result in getting the benefits of plenty of logical operations occurring in fixed function logic of graphics pipeline 1940, where this fixed function logic is not needed to be installed as hardware, which can be slow, wasteful, and costly.

Figure 19D:
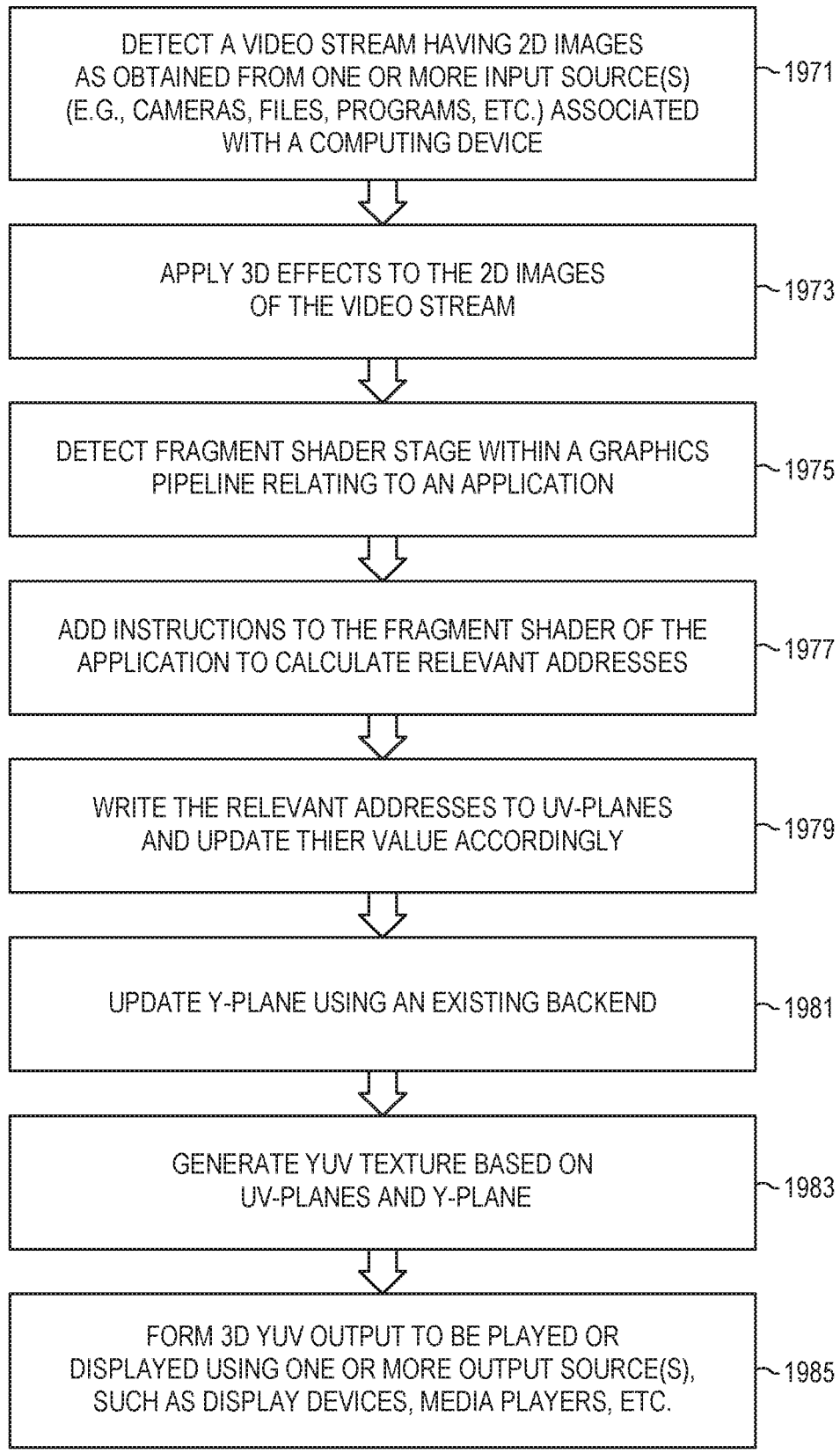
FIG. 19D illustrates a method for facilitating hybrid YUV rendering-based fast path of a graphics pipeline associated with a software application at a computing device according to one embodiment.

FIG. 19D illustrates a method for facilitating hybrid YUV rendering-based fast path of a graphics pipeline associated with a software application at a computing device according to one embodiment. Method 1970 may be performed by processing logic that may comprise hardware (e.g., circuitry, dedicated logic, programmable logic, etc.), software (such as instructions run on a processing device), or a combination thereof, as facilitated by hybrid mechanism 1510 of FIG. 15. The processes of method 1970 are illustrated in linear sequences for brevity and clarity in presentation; however, it is contemplated that any number of them can be performed in parallel, asynchronously, or in different orders. For brevity, many of the details discussed with reference to FIGS. 1-19C may not be discussed or repeated hereafter.

Method 1970 begins at block 1971 with detection of a video stream having 2D images captured by one or more cameras of the computing device, such as computing device 1500 of FIG. 15, wherein the video stream relates to a software application running at or hosted by the computing device, where this detection is facilitated by detection/reception logic 1601 of FIG. 16. In one embodiment, 3D effects are to be added to the video stream and its 2D images and it may be performed by using a 3D API, such as OpenGL®, where, at block 1973, using the 3D API (e.g., OpenGL®), 3D effects are added to the 2D images to then be processed through a graphics pipeline associated with the software application. At block 1975, various stages, such as fixed function and/or programmable stages, of the graphics pipeline are launched and their corresponding processes are performed, including a programmable stage of fragment shader as detected by detection/reception logic 1601 of FIG. 16.

At block 1977, as facilitated by write/update logic 1603 of FIG. 16, any number and type of instructions are added to the fragment shader stage to calculate any relevant addresses capable of being written to UV-planes. At block 1979, these relevant addresses are written to the UV-planes using the existing UAVs and through a UAV write operation, as facilitated by write/update logic 1603 of FIG. 16. At block 1981, as facilitated by write/update logic 1603 of FIG. 16, an existing backend of Y-plane is used to write to and update the Y-plane, such as by tricking the backend into thinking it is using an R8 render target so it writes only the red channel to the Y-plane. At block 1983, the UV-planes are combined with the Y-plane to form a YUV texture, based on the UV/Y-planes, which may the be used to represent a 3D output based on YUV images, as facilitated by hybrid application logic 1605 of FIG. 16. At block 281, the YUV texture-based 3D output of the video stream are displayed or played by one or more of display devices, media players, etc., of I/O source(s) 1504, coupled to or in communication with the computing device, such as computing device 1500 of FIG. 15.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the foregoing specification, embodiments have been described with reference to specific exemplary embodiments thereof. It will, however, be evident that various modifications and changes may be made thereto without departing from the broader spirit and scope of embodiments as set forth in the appended claims. The Specification and drawings are, accordingly, to be regarded in an illustrative rather than a restrictive sense.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system for facilitating hybrid communication according to embodiments and examples described herein.

Some embodiments pertain to Example 1 that includes an apparatus to facilitate hybrid rendering of graphics images in computing environments, the apparatus comprising: detection/reception logic to detect the video stream including two-dimensional (2D) images, wherein the video stream is processed through a graphics pipeline at the apparatus; and hybrid application logic to perform hybrid combination of a luma (Y)-plane with chrominance (UV)-planes to directly generate a YUV texture, wherein the YUV texture is used to generate three-dimensional (3D) images corresponding to the 2D images.

Example 2 includes the subject matter of Example 1, wherein the detection/reception logic is further to detect multiple stages of the graphics pipeline associated with a software application being hosted by the apparatus, wherein the multiple stages include at least one of fixed function stages and programmable stages, wherein the fixed function stages include one or more of vertex fetch, tessellation, rasterization, and fragment operations, and wherein the programmable stages include one or more of vertex shader, hull shader, domain shader, geometry shader, and fragment shader, wherein the 2D images are represented by the 3D images by adding 3D effects to the 2D images through a 3D application programming interface (API) interacting with a graphics processor of the apparatus, wherein the 3D API is based on OpenGL.

Example 3 includes the subject matter of Example 1, wherein the detection/reception logic is further to detect the fragment shader, and wherein the apparatus further comprises write/update logic to add one or more instructions to the fragment shader to calculate one or more addresses based on the one or more instructions, wherein the one or more addresses include one or more memory location addresses.

Example 4 includes the subject matter of Example 3, wherein the write/update logic to perform a UV write operation to write the one or more addresses to the UV-planes, wherein the UV-planes are updated based on the one or more addresses, wherein the UV write operation is facilitated by a store command using one or more of existing components of a graphics infrastructure, wherein the storage command includes an unordered access view (UAV) store command or an image texture store command.

Example 5 includes the subject matter of Example 4, wherein the write/update logic is further to perform a Y write operation to write to and update the Y-plane, wherein the Y plane is updated using a corresponding backend of the one or more existing components, wherein the one or more existing components include one or more graphics-related hardware components.

Example 6 includes the subject matter of Example 1, wherein the hybrid application logic is further to generate the YUV texture by combining the UV-planes with the Y-plane without addition of new hardware or modification of existing hardware, wherein the YUV texture is generated directly using a single processing path without employing another processing path including one or more of conversion to a red green blue (RGB) texture or conversion back from the RGB texture.

Example 7 includes the subject matter of Example 1, further comprising a hybrid rendering component installed as part of the graphics processor, wherein the hybrid rendering component is installed as a new hardware component or a modified existing component of the graphics processor, wherein the hybrid rendering component to directly generate the YUV texture.

Example 8 includes the subject matter of Example 1, further comprising: one or more display devices to display an output of the video stream, wherein the output includes 3D images based on the YUV texture, wherein the video stream is capable of being obtained using one or more of a camera, a video file, and a software program, wherein the video file includes a decided video file, and wherein the software program includes a photo editing program.

Some embodiments pertain to Example 9 that includes a method for facilitating hybrid rendering of graphics images in computing environments, the method comprising: detecting the video stream including two-dimensional (2D) images, wherein the video stream is processed through a graphics pipeline at a computing device; and performing hybrid combination of a luma (Y)-plane with chrominance (UV)-planes to directly generate a YUV texture, wherein the YUV texture is used to generate three-dimensional (3D) images corresponding to the 2D images.

Example 10 includes the subject matter of Example 9, further comprising: detecting multiple stages of the graphics pipeline associated with a software application being hosted by the computing device, wherein the multiple stages include at least one of fixed function stages and programmable stages, wherein the fixed function stages include one or more of vertex fetch, tessellation, rasterization, and fragment operations, and wherein the programmable stages include one or more of vertex shader, hull shader, domain shader, geometry shader, and fragment shader, wherein the 2D images are represented by the 3D images by adding 3D effects to the 2D images through a 3D application programming interface (API) interacting with a graphics processor of the computing device, wherein the 3D API is based on OpenGL.

Example 11 includes the subject matter of Example 9, further comprising: detecting the fragment shader; and adding one or more instructions to the fragment shader to calculate one or more addresses based on the one or more instructions, wherein the one or more addresses include one or more memory location addresses.

Example 12 includes the subject matter of Example 11, further comprising: performing a UV write operation to write the one or more addresses to the UV-planes, wherein the UV-planes are updated based on the one or more addresses, wherein the UV write operation is facilitated by a store command using one or more of existing components of a graphics infrastructure, wherein the storage command includes an unordered access view (UAV) store command or an image texture store command.

Example 13 includes the subject matter of Example 12, further comprising: performing a Y write operation to write to and update the Y-plane, wherein the Y plane is updated using a corresponding backend of the one or more existing components, wherein the one or more existing components include one or more graphics-related hardware components.

Example 14 includes the subject matter of Example 9, further comprising: generating the YUV texture by combining the UV-planes with the Y-plane, wherein the YUV texture is generated without adding new hardware or modifying existing hardware, wherein the YUV texture is generated directly using a single processing path without employing another processing path including one or more of conversion to a red green blue (RGB) texture or conversion back from the RGB texture.

Example 15 includes the subject matter of Example 9, further comprising installing a hybrid rendering component as part of the graphics processor, wherein the hybrid rendering component is installed as a new hardware component or a modified existing component of the graphics processor, wherein the hybrid rendering component to directly generate the YUV texture.

Example 16 includes the subject matter of Example 9, further comprising: one or more display devices to display an output of the video stream, wherein the output includes 3D images based on the YUV texture, wherein the video stream is capable of being obtained using one or more of a camera, a video file, and a software program, wherein the video file includes a decided video file, and wherein the software program includes a photo editing program.

Some embodiments pertain to Example 17 includes a system comprising a storage device having instructions, and a processor to execute the instructions to perform or facilitate a mechanism to perform one or more operations comprising: detecting the video stream including two-dimensional (2D) images, wherein the video stream is processed through a graphics pipeline; and performing hybrid combination of a luma (Y)-plane with chrominance (UV)-planes to directly generate a YUV texture, wherein the YUV texture is used to generate three-dimensional (3D) images corresponding to the 2D images.

Example 18 includes the subject matter of Example 17, wherein the one or more operations comprise: detecting multiple stages of the graphics pipeline associated with a software application being hosted by a computing device, wherein the multiple stages include at least one of fixed function stages and programmable stages, wherein the fixed function stages include one or more of vertex fetch, tessellation, rasterization, and fragment operations, and wherein the programmable stages include one or more of vertex shader, hull shader, domain shader, geometry shader, and fragment shader, wherein the 2D images are represented by the 3D images by adding 3D effects to the 2D images through a 3D application programming interface (API) interacting with a graphics processor of the computing device, wherein the 3D API is based on OpenGL.

Example 19 includes the subject matter of Example 17, wherein the one or more operations comprise: detecting the fragment shader; and adding one or more instructions to the fragment shader to calculate one or more addresses based on the one or more instructions, wherein the one or more addresses include one or more memory location addresses.

Example 20 includes the subject matter of Example 19, wherein the one or more operations comprise: performing a UV write operation to write the one or more addresses to the UV-planes, wherein the UV-planes are updated based on the one or more addresses, wherein the UV write operation is facilitated by a store command using one or more of existing components of a graphics infrastructure, wherein the storage command includes an unordered access view (UAV) store command or an image texture store command.

Example 21 includes the subject matter of Example 20, wherein the one or more operations comprise: performing a Y write operation to write to and update the Y-plane, wherein the Y plane is updated using a corresponding backend of the one or more existing components, wherein the one or more existing components include one or more graphics-related hardware components.

Example 22 includes the subject matter of Example 17, wherein the one or more operations comprise: generating the YUV texture by combining the UV-planes with the Y-plane, wherein the YUV texture is generated without adding new hardware or modifying existing hardware, wherein the YUV texture is generated directly using a single processing path without employing another processing path including one or more of conversion to a red green blue (RGB) texture or conversion back from the RGB texture.

Example 23 includes the subject matter of Example 17, wherein the one or more operations comprise installing a hybrid rendering component as part of the graphics processor, wherein the hybrid rendering component is installed as a new hardware component or a modified existing component of the graphics processor, wherein the hybrid rendering component to directly generate the YUV texture.

Example 24 includes the subject matter of Example 17, wherein the one or more operations comprise: displaying, by one or more display devices, an output of the video stream, wherein the output includes 3D images based on the YUV texture, wherein the video stream is capable of being obtained using one or more of a camera, a video file, and a software program, wherein the video file includes a decided video file, and wherein the software program includes a photo editing program.

Some embodiments pertain to Example 25 includes an apparatus comprising:

means for detecting the video stream including two-dimensional (2D) images, wherein the video stream is processed through a graphics pipeline; and means for performing hybrid combination of a luma (Y)-plane with chrominance (UV)-planes to directly generate a YUV texture, wherein the YUV texture is used to generate three-dimensional (3D) images corresponding to the 2D images.

Example 26 includes the subject matter of Example 25, further comprising: means for detecting multiple stages of the graphics pipeline of the graphics pipeline associated with a software application being hosted by the apparatus, wherein the multiple stages include at least one of fixed function stages and programmable stages, wherein the fixed function stages include one or more of vertex fetch, tessellation, rasterization, and fragment operations, and wherein the programmable stages include one or more of vertex shader, hull shader, domain shader, geometry shader, and fragment shader, wherein the 2D images are represented by the 3D images by adding 3D effects to the 2D images through a 3D application programming interface (API) interacting with a graphics processor of the apparatus, wherein the 3D API is based on OpenGL.

Example 27 includes the subject matter of Example 25, further comprising: means for detecting the fragment shader; and means for adding one or more instructions to the fragment shader to calculate one or more addresses based on the one or more instructions, wherein the one or more addresses include one or more memory location addresses.

Example 28 includes the subject matter of Example 27, further comprising: means for performing a UV write operation to write the one or more addresses to the UV-planes, wherein the UV-planes are updated based on the one or more addresses, wherein the UV write operation is facilitated by a store command using one or more of existing components of a graphics infrastructure, wherein the storage command includes an unordered access view (UAV) store command or an image texture store command.

Example 29 includes the subject matter of Example 28, further comprising: means for performing a Y write operation to write to and update the Y-plane, wherein the Y plane is updated using a corresponding backend of the one or more existing components, wherein the one or more existing components include one or more graphics-related hardware components.

Example 30 includes the subject matter of Example 25, further comprising: means for generating the YUV texture by combining the UV-planes with the Y-plane, wherein the YUV texture is generated without adding new hardware or modifying existing hardware, wherein the YUV texture is generated directly using a single processing path without employing another processing path including one or more of conversion to a red green blue (RGB) texture or conversion back from the RGB texture.

Example 31 includes the subject matter of Example 25, further comprising a hybrid rendering component installed as part of the graphics processor, wherein the hybrid rendering component is installed as a new hardware component or a modified existing component of the graphics processor, wherein the hybrid rendering component to directly generate the YUV texture.

Example 32 includes the subject matter of Example 25, further comprising: means for displaying, by one or more display devices, an output of the video stream, wherein the output includes 3D images based on the YUV texture, wherein the video stream is capable of being obtained using one or more of a camera, a video file, and a software program, wherein the video file includes a decided video file, and wherein the software program includes a photo editing program.

Example 33 includes at least one non-transitory or tangible machine-readable medium comprising a plurality of instructions, when executed on a computing device, to implement or perform a method as claimed in any of claims or examples 9-16.

Example 34 includes at least one machine-readable medium comprising a plurality of instructions, when executed on a computing device, to implement or perform a method as claimed in any of claims or examples 9-16.

Example 35 includes a system comprising a mechanism to implement or perform a method as claimed in any of claims or examples 9-16.

Example 36 includes an apparatus comprising means for performing a method as claimed in any of claims or examples 9-16.

Example 37 includes a computing device arranged to implement or perform a method as claimed in any of claims or examples 9-16.

Example 38 includes a communications device arranged to implement or perform a method as claimed in any of claims or examples 9-16.

Example 39 includes at least one machine-readable medium comprising a plurality of instructions, when executed on a computing device, to implement or perform a method or realize an apparatus as claimed in any preceding claims.

Example 40 includes at least one non-transitory or tangible machine-readable medium comprising a plurality of instructions, when executed on a computing device, to implement or perform a method or realize an apparatus as claimed in any preceding claims.

Example 41 includes a system comprising a mechanism to implement or perform a method or realize an apparatus as claimed in any preceding claims.

Example 42 includes an apparatus comprising means to perform a method as claimed in any preceding claims.

Example 43 includes a computing device arranged to implement or perform a method or realize an apparatus as claimed in any preceding claims.

Example 44 includes a communications device arranged to implement or perform a method or realize an apparatus as claimed in any preceding claims.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus comprising:
   one or more processors to:
   detect a video stream including two-dimensional (2D) images, wherein the video stream is processed through a graphics pipeline; and
   perform hybrid combination of a luma (Y)-plane with chrominance (UV)-planes to directly generate a YUV texture by, in a single pass path, generating the UV-planes and the Y-plane separately without performing Red Green Blue (RGB) related conversion and without detouring from the single pass path, wherein the YUV texture is created by combining the UV-planes with the Y-plane, wherein the YUV texture is used to generate three-dimensional (3D) images corresponding to the 2D images, wherein the Y-plane is rendered using a pixel backend, and wherein the UV-planes are rendered using a store command including an unordered access view (UAV) store command.

2. The apparatus of claim 1, wherein the one or more processors are further to detect multiple stages of the graphics pipeline associated with a software application being hosted by the apparatus, wherein the multiple stages include at least one of fixed function stages and programmable stages, wherein the fixed function stages include one or more of vertex fetch, tessellation, rasterization, and fragment operations, wherein the programmable stages include one or more of vertex shader, hull shader, domain shader, geometry shader, and fragment shader, and wherein the 2D images are represented by the 3D images by adding 3D effects to the 2D images through a 3D application programming interface (API) interacting with a graphics processor of the apparatus, wherein the 3D API is based on OpenGL.

3. The apparatus of claim 1, wherein the one or more processors are further to detect the fragment shader, wherein the one or more processors are further to add one or more instructions to the fragment shader to calculate one or more addresses based on the one or more instructions, and wherein the one or more addresses include one or more memory location addresses.

4. The apparatus of claim 3, wherein the one or more processors are further to perform a UV write operation to write the one or more addresses to the UV-planes, wherein the UV-planes are updated based on the one or more addresses, wherein the UV write operation is facilitated by the store command using one or more of existing components of a graphics infrastructure, and wherein the store command further includes an Image texture store command.

5. The apparatus of claim 4, wherein the one or more processors are further to perform a Y write operation to write to and update the Y-plane, wherein the Y plane is updated using the pixel backend of the one or more existing components, and wherein the one or more existing components include one or more graphics-related hardware components.

6. The apparatus of claim 1, wherein the one or more processors are further to generate the YUV texture by combining the UV-planes with the Y-plane without addition of new hardware or modification of existing hardware, and wherein the YUV texture is generated directly using a single processing path without employing another processing path including one or more of conversion to a red green blue (RGB) texture or conversion back from the RGB texture.

7. The apparatus of claim 1, further comprising a hybrid rendering component installed as part of the graphics processor, wherein the hybrid rendering component is installed as a new hardware component or a modified existing component of the graphics processor, and wherein the hybrid rendering component is further to directly generate the YUV texture.

8. The apparatus of claim 1, further comprising: one or more display devices to display an output of the video stream, wherein the output includes 3D images based on the YUV texture, wherein the video stream is capable of being obtained using one or more of a camera, a video file, and a software program, wherein the video file includes a decoded video file, and wherein the software program includes a photo editing program.

9. A method comprising:
 detecting a video stream including two-dimensional (2D) images, wherein the video stream is processed through a graphics pipeline at a computing device; and
 performing hybrid combination of a luma (Y)-plane with chrominance (UV)-planes to directly generate a YUV texture by, in a single pass path, generating the UV-planes and the Y-plane separately without performing Red Green Blue (RGB) related conversion and without detouring from the single pass path, wherein the YUV texture is created by combining the UV-planes with the Y-plane, wherein the YUV texture is used to generate three-dimensional (3D) images corresponding to the 2D images, wherein the Y-plane is rendered using a pixel backend, and wherein the UV-planes are rendered using a store command including an unordered access view (UAV) store command.

10. The method of claim 9, further comprising: detecting multiple stages of the graphics pipeline associated with a software application being hosted by the computing device, wherein the multiple stages include at least one of fixed function stages and programmable stages, wherein the fixed function stages include one or more of vertex fetch, tessellation, rasterization, and fragment operations, wherein the programmable stages include one or more of vertex shader, hull shader, domain shader, geometry shader, and fragment shader, wherein the 2D images are represented by the 3D images by adding 3D effects to the 2D images through a 3D application programming interface (API) interacting with a graphics processor of the apparatus, and wherein the 3D API is based on OpenGL.

11. The method of claim 9, further comprising:
 detecting the fragment shader; and
 adding one or more instructions to the fragment shader to calculate one or more addresses based on the one or more instructions, wherein the one or more addresses include one or more memory location addresses.

12. The method of claim 11, further comprising: performing a UV write operation to write the one or more addresses to the UV-planes, wherein the UV-planes are updated based on the one or more addresses, wherein the UV write operation is facilitated by the store command using one or more of existing components of a graphics infrastructure, and wherein the store command further includes an image texture store command.

13. The method of claim 12, further comprising: performing a Y write operation to write to and update the Y-plane, wherein the Y plane is updated using the pixel backend of the one or more existing components, and wherein the one or more existing components include one or more graphics-related hardware components.

14. The method of claim 9, further comprising: generating the YUV texture by combining the UV-planes with the Y-plane, wherein the YUV texture is generated without adding new hardware or modifying existing hardware, and wherein the YUV texture is generated directly using a single processing path without employing another processing path including one or more of conversion to a red green blue (RGB) texture or conversion back from the RGB texture.

15. The method of claim 9, further comprising installing a hybrid rendering component as part of the graphics processor, wherein the hybrid rendering component is installed as a new hardware component or a modified existing component of the graphics processor, and wherein the hybrid rendering component to directly generate the YUV texture.

16. The method of claim 9, further comprising: one or more display devices to display an output of the video stream, wherein the output includes 3D images based on the YUV texture, wherein the video stream is capable of being obtained using one or more of a camera, a video file, and a software program, wherein the video file includes a decoded video file, and wherein the software program includes a photo editing program.

17. At least one non-transitory machine-readable storage medium comprising a plurality of instructions, executed on a computing device, to facilitate the computing device to perform operations comprising:
 detecting the video stream including two-dimensional (2D) images, wherein the video stream is processed through a graphics pipeline; and
 performing hybrid combination of a luma (Y)-plane with chrominance (UV)-planes to directly generate a YUV texture by, in a single pass path, generating the UV-planes and the Y-plane separately without performing Red Green Blue (RGB) related conversion and without detouring from the single pass path, wherein the YUV texture is created by combining the UV-planes with the Y-plane, wherein the YUV texture is used to generate three-dimensional (3D) images corresponding to the 2D images, wherein the Y-plane is rendered using a pixel backend, and wherein the UV-planes are rendered using a store command including an unordered access view (UAV) store command.

18. The machine-readable storage medium of claim 17, wherein the operations further comprise: detecting multiple stages of the graphics pipeline associated with a software application being hosted by the computing device, wherein the multiple stages include at least one of fixed function stages and programmable stages, wherein the fixed function stages include one or more of vertex fetch, tessellation, rasterization, and fragment operations, and wherein the programmable stages include one or more of vertex shader, hull shader, domain shader, geometry shader, and fragment shader, wherein the 2D images are represented by the 3D images by adding 3D effects to the 2D images through a 3D application programming interface (API) interacting with a graphics processor of the apparatus, and wherein the 3D API is based on OpenGL.

19. The machine-readable storage medium of claim 17, wherein the operations further comprise:
 detecting the fragment shader; and
 adding one or more instructions to the fragment shader to calculate one or more addresses based on the one or more instructions, wherein the one or more addresses include one or more memory location addresses.

20. The machine-readable storage medium of claim 19, wherein the operations further comprise: performing a UV write operation to write the one or more addresses to the UV-planes, wherein the UV-planes are updated based on the one or more addresses, wherein the UV write operation is facilitated by the store command using one or more of existing components of a graphics infrastructure, and wherein the store command further includes an image texture store command.

21. The machine-readable storage medium of claim 20, wherein the operations further comprise: performing the Y write operation to write to and update a Y-plane, wherein the Y plane is updated using the pixel backend of the one or more existing components, and wherein the one or more existing components include one or more graphics-related hardware components.

22. The machine-readable storage medium of claim 17, wherein the operations further comprise: generating the YUV texture by combining the UV-planes with the Y-plane, and wherein the YUV texture is generated without adding new hardware or modifying existing hardware, and wherein the YUV texture is generated directly using a single processing path without employing another processing path including one or more of conversion to a red green blue (RGB) texture or conversion back from the RGB texture.

23. The machine-readable storage medium of claim 17, wherein the operations further comprise installing a hybrid rendering component as part of the graphics processor, wherein the hybrid rendering component is installed as a new hardware component or a modified existing component of the graphics processor, and wherein the hybrid rendering component to directly generate the YUV texture.

24. The machine-readable storage medium of claim 17, wherein the operations further comprise: one or more display devices to display an output of the video stream, wherein the output includes 3D images based on the YUV texture, wherein the video stream is capable of being obtained using one or more of a camera, a video file, and a software program, wherein the video file includes a decoded video file, and wherein the software program includes a photo editing program.

* * * * *